United States Patent
Dumais

(10) Patent No.: US 12,044,197 B2
(45) Date of Patent: Jul. 23, 2024

(54) AIR FILTRATION SYSTEM FOR COMBUSTION ENGINE AND COMBUSTION ENGINE INCLUDING SAME

(71) Applicant: PROPULSA INNOVATIONS INC., Chicoutimi (CA)

(72) Inventor: Denis Dumais, Chicoutimi (CA)

(73) Assignee: PROPULSA INNOVATIONS INC., Chicoutimi (CA)

( * ) Notice: Subject to any disclaimer, the term of this patent is extended or adjusted under 35 U.S.C. 154(b) by 768 days.

(21) Appl. No.: 15/734,980

(22) PCT Filed: Jun. 7, 2019

(86) PCT No.: PCT/CA2019/050796
§ 371 (c)(1),
(2) Date: Dec. 3, 2020

(87) PCT Pub. No.: WO2019/232638
PCT Pub. Date: Dec. 12, 2019

(65) Prior Publication Data
US 2021/0231084 A1    Jul. 29, 2021

Related U.S. Application Data

(60) Provisional application No. 62/681,948, filed on Jun. 7, 2018.

(51) Int. Cl.
*B01D 46/42* (2006.01)
*B01D 46/00* (2022.01)
(Continued)

(52) U.S. Cl.
CPC ............... *F02M 35/02416* (2013.01); *B01D 46/0005* (2013.01); *B01D 46/0053* (2013.01);
(Continued)

(58) Field of Classification Search
CPC ............ B01D 47/0005; B01D 47/0043; B01D 47/0047; B01D 47/10; B01D 47/58;
(Continued)

(56) References Cited

U.S. PATENT DOCUMENTS

| | | |
|---|---|---|
| 3,748,836 A | 7/1973 | Bachle |
| 3,972,700 A | 8/1976 | Gleockler et al. |

(Continued)

FOREIGN PATENT DOCUMENTS

| | | |
|---|---|---|
| CN | 1749550 | 3/2006 |
| CN | 203916302 | 11/2014 |

(Continued)

OTHER PUBLICATIONS

Parker, "Dynavane self-cleaning inertial air filter", product, http://ph.parker.com/us/en/dynavane-self-cleaning-inertial-air-filter.
(Continued)

*Primary Examiner* — Frank M Lawrence, Jr.
(74) *Attorney, Agent, or Firm* — Renner, Otto, Boisselle & Sklar, LLP

(57) ABSTRACT

An air filtration system comprises a filter housing that defines a collection chamber and includes an air inlet, an air outlet and a cleaning assembly opening in fluid communication with the collection chamber. The system also comprises a filter support mounted to the filter housing with each one of the air inlet and the air outlet being located on a respective side of the filter support; and a filter cleaning assembly mounted to the filter housing and including an actuation system; and a diaphragm assembly at least partially covering the filter cleaning opening. The diaphragm assembly vibrates upon actuation of the actuation system so as to displace air in the collection chamber to remove particulate matter from a filter engaged with the filter support. The present disclosure also concerns a combustion
(Continued)

engine comprising an air filtration system and a method for cleaning an air filtration system.

20 Claims, 21 Drawing Sheets

(51) Int. Cl.
*B01D 46/04* (2006.01)
*B01D 46/10* (2006.01)
*F02M 35/02* (2006.01)
*F02M 35/024* (2006.01)
*B01D 46/58* (2022.01)

(52) U.S. Cl.
CPC .............. *B01D 46/04* (2013.01); *B01D 46/10* (2013.01); *F02M 35/0205* (2013.01); *B01D 46/58* (2022.01); *B01D 2279/60* (2013.01)

(58) Field of Classification Search
CPC ............... B01D 47/0053; B01D 47/04; B01D 2279/60; Y02A 50/2351; F02M 35/0201; F02M 35/0205; F02M 35/024; F02M 35/02416; F02M 35/02483; F02M 35/086
USPC ......... 55/283, 284, 286, 287, 292, 293, 301, 55/304, 385.3
See application file for complete search history.

(56) References Cited

U.S. PATENT DOCUMENTS

| | | | |
|---|---|---|---|
| 4,201,556 A * | 5/1980 | Olsson ................... | B01D 46/10 95/280 |
| 4,233,040 A | 11/1980 | Vogelaar et al. | |
| 4,340,401 A | 7/1982 | Van Weelden | |
| 4,482,367 A | 11/1984 | Howeth | |
| 4,787,923 A | 11/1988 | Fleigle et al. | |
| 4,842,624 A | 6/1989 | Barton | |
| 4,971,026 A | 11/1990 | Fineblum | |
| 5,156,660 A | 10/1992 | Wilson | |
| 5,632,243 A | 5/1997 | Buchholz | |
| 5,900,043 A | 5/1999 | Grandjean et al. | |
| 6,202,765 B1 | 3/2001 | Schaffer | |
| 6,605,131 B2 | 8/2003 | Vanderveen et al. | |
| 7,384,455 B2 * | 6/2008 | Sellers ................... | F01N 3/2093 55/303 |
| 7,468,085 B2 * | 12/2008 | Goddard ............ | B01D 46/2418 60/275 |
| 8,382,870 B2 | 3/2013 | Troxell et al. | |
| 2004/0118283 A1 * | 6/2004 | Hering ................... | B01D 46/10 55/300 |
| 2008/0017031 A1 | 1/2008 | Vo | |

FOREIGN PATENT DOCUMENTS

| | | | | |
|---|---|---|---|---|
| CN | 105649835 | | 6/2016 | |
| CN | 106762258 | A | 5/2017 | |
| EP | 0970652 | A2 | 1/2000 | |
| EP | 2138700 | A2 * | 12/2009 | ......... F02M 35/0202 |
| EP | 2138700 | A2 | 12/2009 | |
| WO | 2006004586 | A2 | 1/2006 | |

OTHER PUBLICATIONS

Maradyne, "Extended Performance Air Cleaner", http://www.uafilter.com/epac-system.html#wow1.

International Search Report and Written Opinion dated Aug. 15, 2019, for International Patent Application No. PCT/CA2019/050796.

International Preliminary Report on Patentability dated May 14, 2020, for International Patent Application No. PCT/CA2019/050796.

EPO Office Action corresponding to counterpart European application No. 19814571.6 dated Nov. 28, 2023.

* cited by examiner

AIR FILTRATION SYSTEM FOR COMBUSTION ENGINE AND COMBUSTION ENGINE INCLUDING SAME

This application is a national phase of International Application No. PCT/CA2019/050796 filed Jun. 7, 2019 and published in the English language, which claims priority to U.S. Provisional Application No. 62/681,948 filed Jun. 7, 2018.

CROSS-REFERENCE TO RELATED APPLICATION

This application claims the benefit of U.S. Provisional application 62/681,948 filed on Jun. 7, 2018 and entitled "AIR FILTRATION SYSTEM FOR COMBUSTION ENGINE AND COMBUSTION ENGINE INCLUDING SAME". This US Provisional patent application is incorporated herein by reference in its entirety.

TECHNICAL FIELD

The technical field relates to air filters, more specifically to an air filtration system, which can be used to filter the air intake stream of a combustion engine. It also relates to a combustion engine including an air filtration system and to a method for cleaning an air filtration system.

BACKGROUND

Current air filtration systems require frequent maintenance and replacement of components due to the accumulation of particulate matter on the filter. Indeed, when the air filtration system is used in the air intake stream of a combustion engine, a clogged filter reduces the amount of air that can be directed towards the engine. The engine thus needs to increase its consumption of fuel to compensate for the decrease in air intake. Moreover, as the particulate matter accumulates on the air filter, the pressure differential through the filter, i.e. the pressure difference between upstream of the air filter and downstream of the air filter, tends to increase, resulting in an increase of the risk for the engine and the components of the equipment to be damaged. Besides, when the filter is removed for it to be replaced or cleaned, the air filtration system has to be stopped. There is furthermore a risk that the new or cleaned filter be not put back in place properly.

In view of the above, there is a need for an air filtration system which would be able to overcome or at least minimize some of the above-discussed prior art concerns.

BRIEF SUMMARY

It is therefore an aim of the present invention to address the above-mentioned issues.

In accordance with a general aspect, there is provided an air filtration system comprising a filter housing defining a collection chamber and comprising an air inlet, an air outlet and a cleaning assembly opening. The air inlet, the air outlet and the cleaning assembly opening are in fluid communication with the collection chamber. The air filtration system comprises a filter support mounted to the filter housing and extending in the collection chamber, with each one of the air inlet and the air outlet being located on a respective side of the filter support; and a filter cleaning assembly mounted to the filter housing and comprising: an actuation system; and a diaphragm assembly comprising: a flexible membrane secured to the filter housing and at least partially covering the cleaning assembly opening; and a mobile diaphragm mounted to the filter housing via the flexible membrane. The mobile diaphragm is engageable into at least one of vibration and displacement upon actuation of the actuation system for the mobile diaphragm to displace air in the collection chamber so as to remove particulate matter from a filter engaged with the filter support.

In accordance with another general aspect, there is provided an air filtration system comprising: a filter housing defining a collection chamber and comprising an air inlet, an air outlet and a cleaning assembly opening, the air inlet, the air outlet and the cleaning assembly opening being in fluid communication with the collection chamber; a filter support mounted to the filter housing and extending in the collection chamber with each one of the air inlet and the air outlet being located on a respective side of the filter support; and a filter cleaning assembly mounted to the filter housing. The filter cleaning assembly comprises: an actuation system; and a diaphragm assembly mounted to the filter housing and at least partially covering the filter cleaning opening. The diaphragm assembly vibrates upon actuation of the actuation system so as to displace air in the collection chamber to remove particulate matter from a filter engaged with the filter support.

In accordance with another general aspect, there is provided an air filtration system comprising: a filter housing defining a collection chamber and having an air inlet and an air outlet; a filter extending in the collection chamber, the air inlet and the air outlet being in fluid communication through the filter; and a filter cleaning assembly comprising: an actuator operatively coupled to the filter housing; a flexible membrane extending in or at least partially covering an opening defined in the filter housing in fluid communication with the collection chamber; and a diaphragm mounted to the filter housing via the flexible membrane, wherein the diaphragm is engageable into at least one of vibration and displacement upon actuation of the actuator, said at least one of vibration and displacement displacing air in the collection chamber to remove particulate matter from the filter.

In accordance with another general aspect, there is provided an air filtration system comprising: a filter housing defining a collection chamber and having an air inlet and an air outlet; a filter extending in the collection chamber, the air inlet and the air outlet being in fluid communication through the filter; and a filter cleaning assembly comprising: a flexible membrane extending in or at least partially covering an opening formed in the filter housing in fluid communication with the collection chamber; and a diaphragm to make the flexible membrane to vibrate and/or be displaced, the vibration and/or displacement of at least one of the flexible membrane and the diaphragm displacing air in the collection chamber to remove particulate matter from the filter.

In accordance with still another general aspect, there is provided a combustion engine comprising an air filtration system according to the present disclosure.

In accordance with another general aspect, there is provided an air filtration assembly comprising a plurality of air filtration systems according to the present disclosure.

In accordance with another general aspect, there is provided a method for cleaning the air filtration system as described above. The method comprises monitoring an operating variable related to the air filtration system; and actuating the actuation system when the monitored operating variable corresponds to a predetermined cleaning condition.

In accordance with a further general aspect, there is provided a method for cleaning an air filtration system as described above. The method comprises: monitoring a parameter relating to the air filtration system; and engaging into at least one of vibration and displacement the diaphragm of the air filtration system when the parameter has a value corresponding to a predetermined cleaning condition.

DETAILED DESCRIPTION

Figure 1:
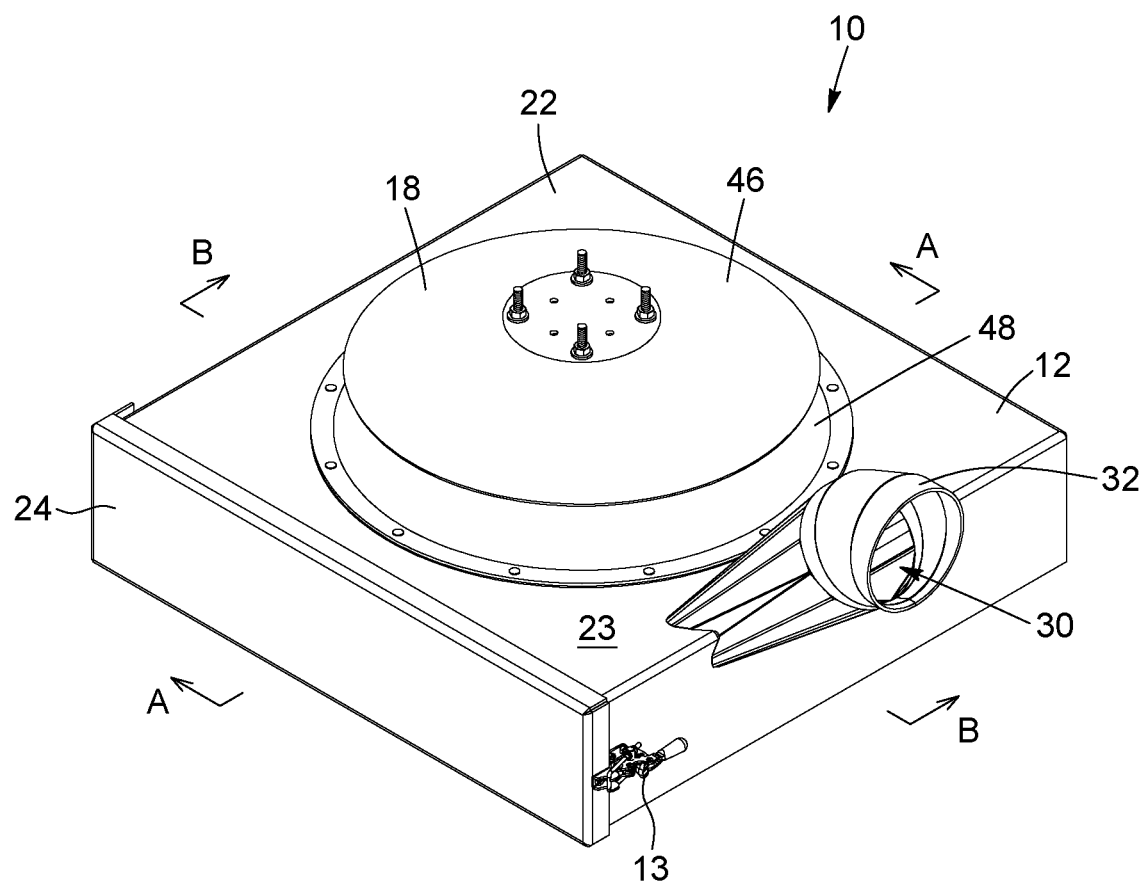
FIG. 1 is a top perspective view of a first embodiment of an air filtration system comprising a filter and a filter cleaning assembly.
Figure 2:
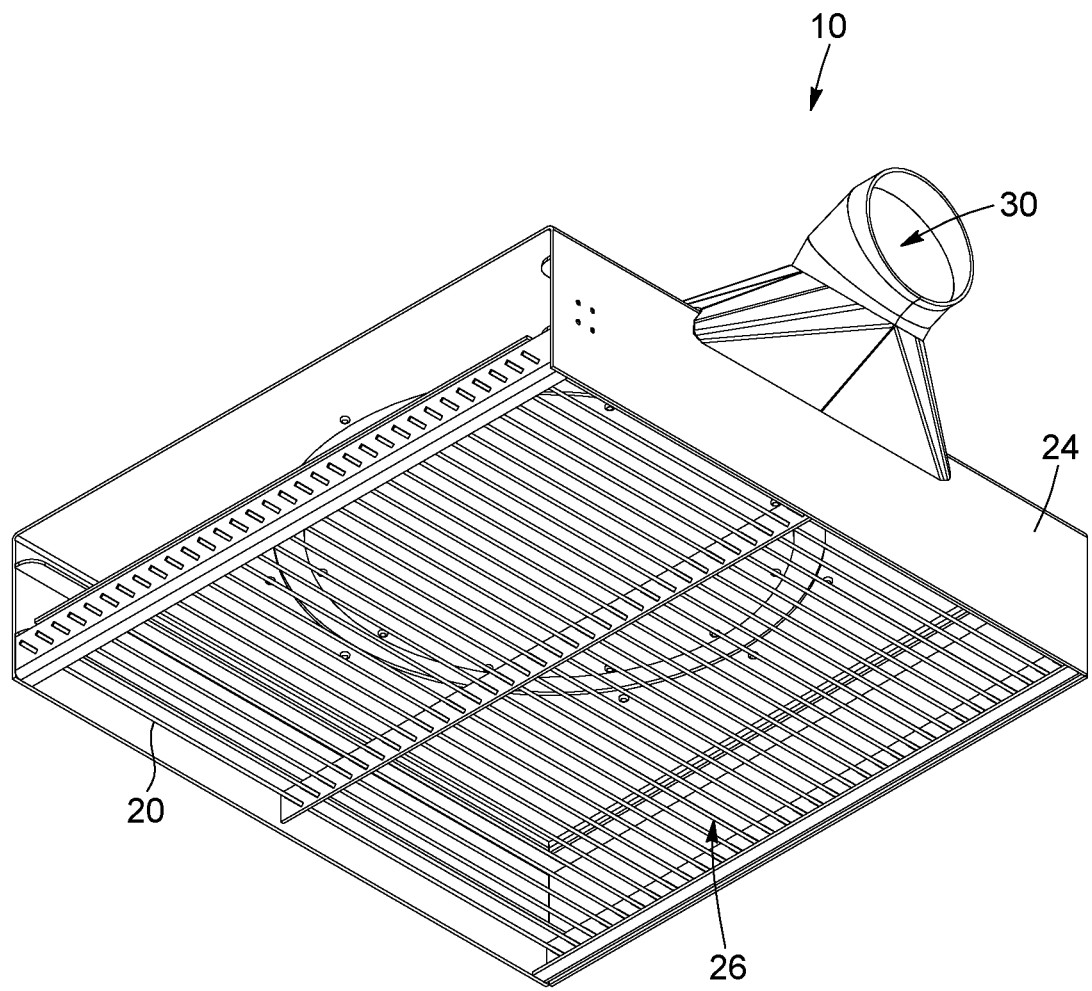
FIG. 2 is a bottom perspective view of the air filtration system of FIG. 1.
Figure 3:
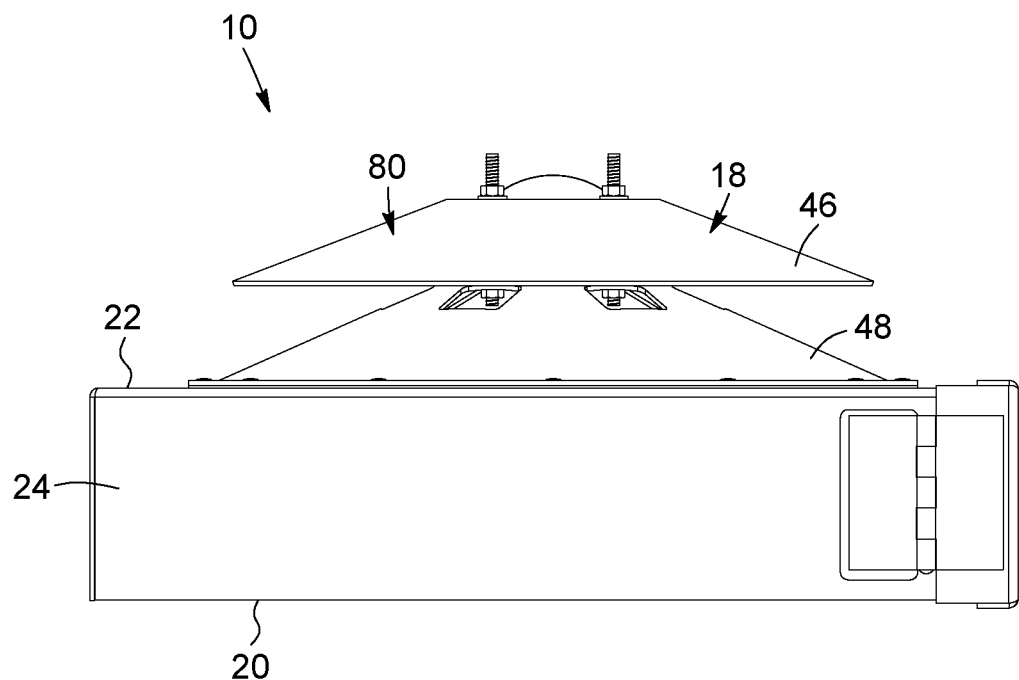
FIG. 3 is a side elevation view of the air filtration system of FIG. 1.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as "above", "below", "forward", "rearward" "left", "right" and the like should, unless otherwise indicated, be taken in the context of the figures. Positional descriptions should however not be considered limiting.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

It is to be understood that the phraseology and terminology employed herein is not to be construed as limiting and are for descriptive purpose only.

The principles and uses of the teachings of the present disclosure may be better understood with reference to the accompanying description, figures and examples.

Furthermore, it is to be understood that the disclosure can be carried out or practiced in various ways and that the disclosure can be implemented in embodiments other than the ones outlined in the description above.

It is to be understood that the terms "including", "comprising", and grammatical variants thereof do not preclude the addition of one or more components, features, steps, or integers or groups thereof and that the terms are to be construed as specifying components, features, steps or integers.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Referring now to the drawings, and more particularly to FIGS. 1 to 12, there is shown a first embodiment of an air filtration system 10 that is configured to be used, for instance but without being limitative, in the air intake stream of a combustion engine having a filtration system (not represented). Therefore, the air filtration system 10 can be used as a supplemental air filtration system 10, which can be easily mounted upstream to the filtration system that is supplied with the combustion engine. The air filtration system 10 can also be used to filter air entering the cabin of an operator driving a heavy equipment, such as a heavy motorized vehicle, or any other space in which air has to be filtered. The air filtration system 10 according to the present disclosure thus increases the filtering efficiency of the filtration system of the combustion engine or in the vehicle cabin and thus increases the air quality therein.

Figure 4:
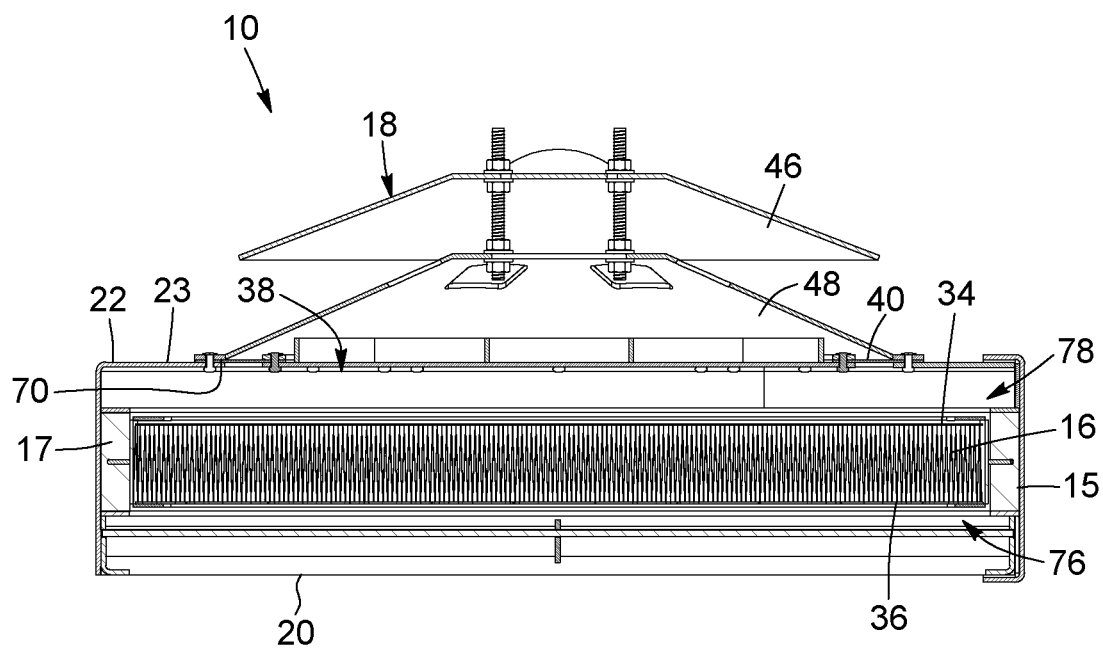
FIG. 4 is a sectional view taken along cross-section lines A-A of the air filtration system of FIG. 1.

The air filtration system 10 comprises a filter housing 12 defining a collection chamber 14 (FIG. 5), a filter support 15 mounted to the filter housing 12 and extending in the collection chamber 14. The filter support 15 is configured to support a filter 16 (FIG. 4). The air filtration system 10 further comprises a filter cleaning assembly 18 configured to clean the filter 16 by removing at least partially particulate matter therefrom.

In the following description, it should be understood that the terms outward, outwardly, outer, inward, inwardly or inner are defined with regard to the filter housing 12 and more particularly to the collection chamber 14 defined by the filter housing 12.

In the embodiment shown, the filter housing 12 has a substantially rectangular block shape. However, it is appreciated that the shape and the configuration of the filter housing 12 can vary from the embodiment shown. The filter housing 12 has a bottom wall 20, an opposed top wall 22, extending in a plane substantially parallel to the bottom wall 20, and four substantially rectangular side walls 24 extending transversally—substantially perpendicularly in the embodiment shown—between the top wall 22 and the bottom wall 20. As represented in particular in FIG. 2, the bottom wall 20 of the filter housing 12 is grated. In the embodiment shown, the filter housing 12 is configurable into a closed configuration, and into an open configuration (not represented) in which access to the collection chamber 14 is provided, for instance to remove and replace the filter 16. The filter housing 12 further comprises a locking assembly 13 (FIG. 1) configured to lock the filter housing 12 in the closed configuration. In the embodiment shown, as represented in FIG. 1, the locking assembly 13 is mounted to two adjacent side walls 24 (to outer faces thereof) of the filter housing 12 so as to secure the two adjacent side walls 24 together when the filter housing 12 is in the closed configuration.

The filter housing 12 comprises an air inlet 26 that is formed, in the embodiment shown, in the bottom wall 20. In the embodiment shown, the grated bottom wall 22 comprises a plurality of spaced-apart blades 28 extending substantially parallel to each other and the air inlet 26 is defined by the spaces defined between adjacent ones of the spaced-apart blades 28. It is appreciated that the shape, the configuration, and the location of the air inlet 26 can vary from the embodiment shown.

Figure 5:
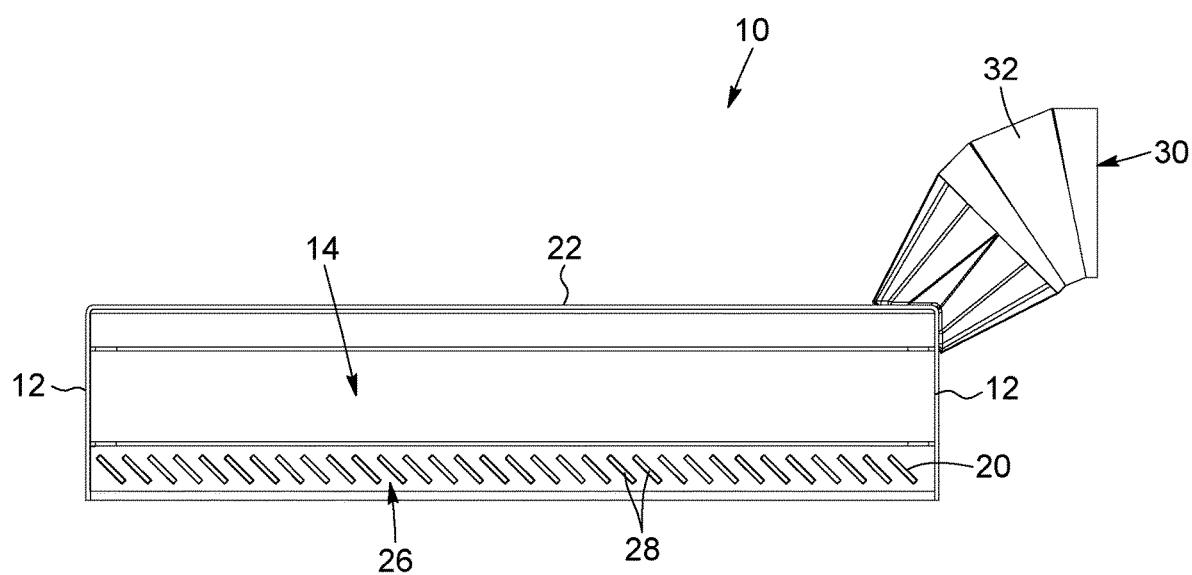
FIG. 5 is a sectional view taken along cross-section lines B-B of the air filtration system of FIG. 1, the filter and the filter cleaning assembly being removed.
Figure 6:
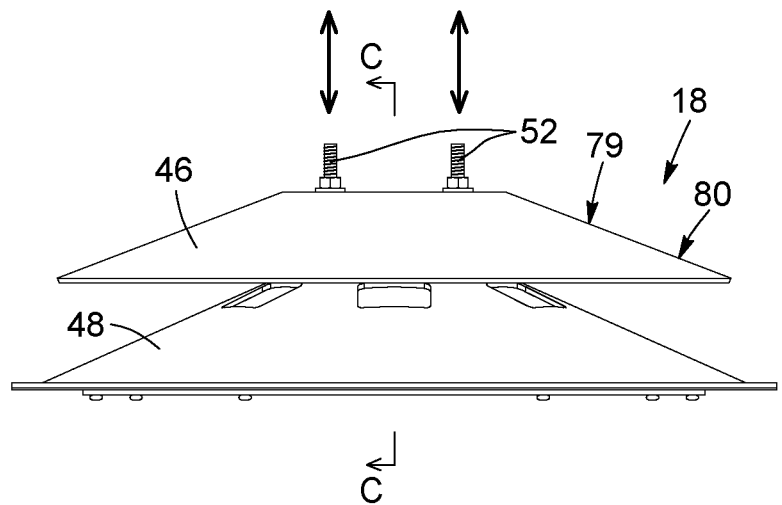
FIG. 6 is a side elevation view of the filter cleaning assembly of the air filtration system of FIG. 1, the filter cleaning assembly comprising an actuation system and a diaphragm assembly.
Figure 7:
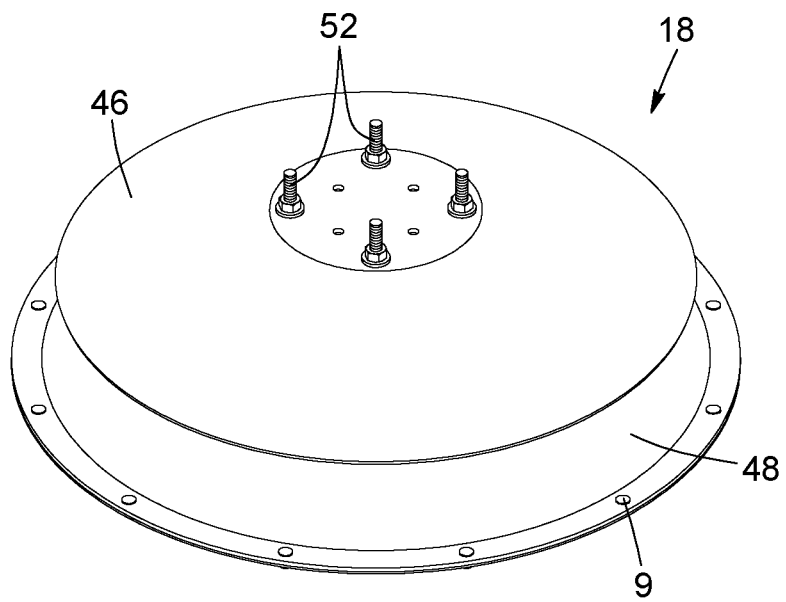
FIG. 7 is a top perspective view of the filter cleaning assembly of FIG. 6.

The filter housing 12 further comprises an air outlet 30. In the embodiment shown, an air outlet duct 32 is mounted to the top wall 22 and to one of the side walls 24 of the filter housing 12. The air outlet duct 32 extends outwardly and substantially upwardly. As represented in FIGS. 1 and 5, the air outlet duct 32 has a substantially cylindrical shape and comprises a through opening in fluid communication with the collection chamber 14, the air outlet 30 being defined by the through opening of the air outlet duct 32. It is appreciated that the shape, the configuration, and the location of the air outlet 30 can vary from the embodiment shown.

The air inlet 26 and the air outlet 30 are located on opposed sides of the filter 16 which extends in the collection chamber 14. In other words, the air inlet 26 and the air outlet 30 are in fluid communication with each other through the filter 16.

A cleaning assembly opening 38 is further defined in the filter housing 12 and is in fluid communication with the collection chamber 14. In the embodiment shown, the cleaning assembly opening 38 is formed in the top wall 22 of the filter housing 12. For instance, the cleaning assembly opening 38 has a substantially circular cross-section and defines an opening diameter d2. However, it is appreciated that the shape (or cross-section), the configuration, and the location of the cleaning assembly opening 38 with regards to the filter housing 12 can vary from the embodiment shown.

As mentioned above, the filter 16 is mounted to the filter housing 12 and extends in the collection chamber 14 of the filter housing 12 so that the air inlet 26 and the air outlet 30 are in fluid communication with each other through the filter 16. As represented in particular in FIG. 4, the filter 16 has a substantially rectangular block shape and is secured to inner surfaces of the side walls 24 of the filter housing 12. The air filtration system 10 may further comprise a peripheral gasket 17 to ensure a tight securing of the filter 16 to the filter housing 12 within the collection chamber 14, so as to ensure that an air flow circulating from the air inlet 26 towards the air outlet 30 circulates exclusively through the filter 16. In other words, the mounting of the filter 16 in the collection chamber 14 is configured to ensure an efficient filtering of the air flow.

The filter 16 is typically formed of a polyester substrate with a PTFE membrane; in some other embodiments, the filter 16 comprises spunbonded polyester or acrylic. The filter 16 is configured to retain particulate matter having dimensions greater than a predetermined filtering threshold when the air flow circulates from the air inlet 26 towards the air outlet 30. In some embodiments, the filter 16 is dimensioned so as to retain particulate matter having dimensions greater than about 0.5 µm. In some other embodiments, the filter 16 is dimensioned so as to retain particulate matter having dimensions greater than about 0.3 µm. In yet some other embodiments, the filter 16 is dimensioned so as to retain particulate matter having dimensions greater than about 0.1 µm. In yet some other embodiments, the filter 16 is dimensioned so as to retain particulate matter having dimensions greater than about 0.05 µm. In some other embodiments, the filter 16 is dimensioned so as to retain more than about 99% of particulate matter having dimensions greater than about 0.05 µm. In yet some other embodiments, the filter 16 is dimensioned so as to retain more than about 99.5% of particulate matter having dimensions greater than about 0.05 µm. In yet some other embodiments, the filter 16 is dimensioned so as to retain more than about 99.7% of particulate matter having dimensions greater than about 0.05 µm.

The filter 16 comprises an upper face 34 facing towards the air outlet 30 and towards the top wall 22 of the filter housing 12, and an opposed lower face 36 facing towards the air inlet 26 and towards the bottom wall 20 of the filter housing 12.

The filter cleaning assembly 18 comprises an actuation system 80 operatively coupled to the filter housing 12. For instance, the actuation system 80 comprises an actuator having a hydraulic cylinder or a pneumatic cylinder. It should be understood that the coupling of the actuation system 80 to the filter housing 12 can be either direct or indirect. In other words, the actuation system 80 can be operatively coupled to any other part of the air filtration system 10 connected to the filter housing 12.

As represented in FIGS. 6 to 11, the filter cleaning assembly 18 further comprises a diaphragm assembly 90 (FIG. 9) mounted to the filter housing 12 and operatively coupled to the actuation system 80. As detailed below, the diaphragm assembly 90 is configured to be engageable into at least one of vibration and displacement upon actuation of the actuation system 80 for the vibration and/or displacement of the diaphragm assembly 90 to displace air in the collection chamber 14 to remove particulate matter from the filter 16.

In the embodiment shown, the diaphragm assembly 90 comprises a flexible membrane 40—for instance made of rubber or any other material having flexibility and elasticity (resilient) properties—extending in the cleaning assembly opening 38 formed in the filter housing 12 or at least partially covering the cleaning assembly opening 38. In other words, and as detailed below, the flexible membrane 40 of the diaphragm assembly 90 is configured to be elastically deformed upon displacement of surrounding air. In the embodiment shown in which the cleaning assembly opening 38 is formed in the top wall 22 of the filter housing 12, and as represented in particular in FIG. 4, the flexible membrane 40 has a substantially annular shape and is secured to an outer face 23 of the top wall 22 of the filter housing 12. In the embodiment shown, the flexible membrane 40 extends along a peripheral edge 70 of the filter housing 12 defining the cleaning assembly opening 38, towards a center of the cleaning assembly opening 38 (i.e. inwardly considered with respect to the center of the cleaning assembly opening 38). For instance, the flexible membrane 40 is glued or riveted to the outer face 23 of the top wall 22. It is thus understood that the flexible membrane 40 is secured to the filter housing 12 and at least partially covers the cleaning assembly opening 38 formed in the filter housing 12. It is appreciated that the shape, the location and the mechanical fastening of the flexible membrane 40 to the filter housing 12 can vary from the embodiment shown.

Figure 10:
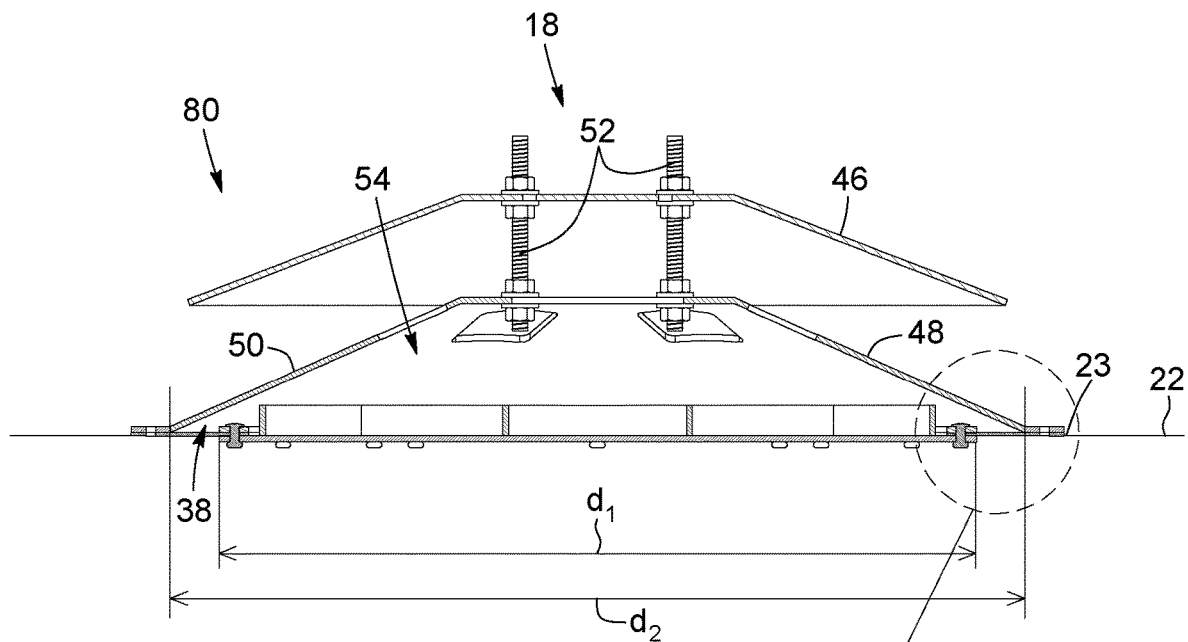
FIG. 10. is a sectional view taken along cross-section lines C-C of the filter cleaning assembly of FIG. 6.
Figure 11:
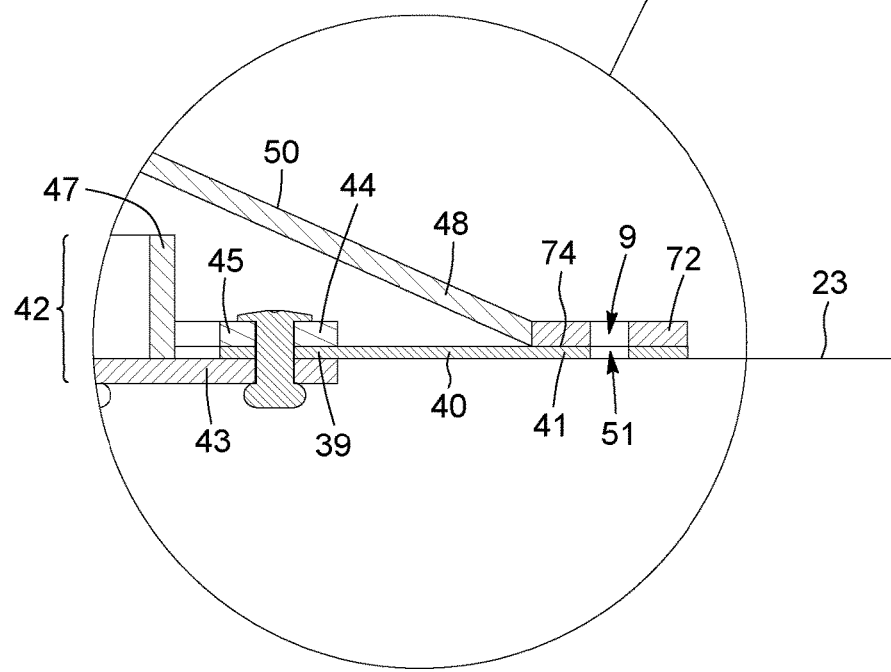
FIG. 11 is an enlarged view of the part D of the filter cleaning assembly of FIG. 10.
Figure 12:
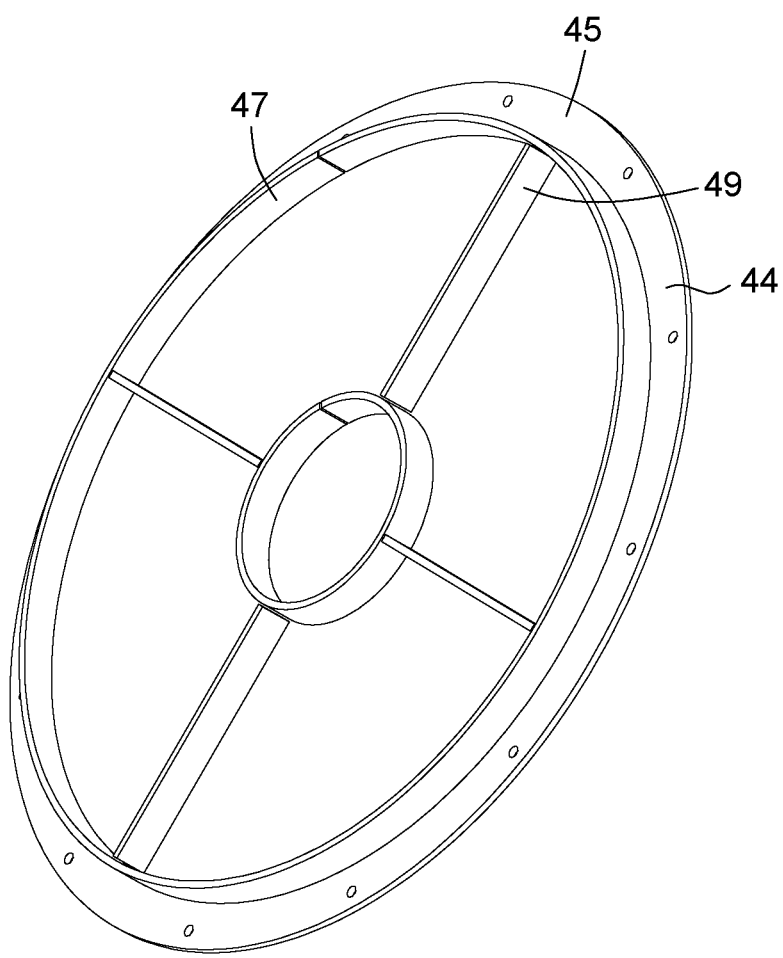
FIG. 12 is a top perspective view of a vibrable diaphragm of the diaphragm assembly of FIG. 6.

In the embodiment shown, as represented in FIGS. 10 and 11, the diaphragm assembly 90 of the filter cleaning assembly 18 further comprises a vibrable diaphragm 42 mounted to the filter housing 12 via the flexible membrane 40 and extending in the cleaning assembly opening 38—or in the vicinity thereof—formed in the filter housing 12. In the embodiment shown, the vibrable diaphragm 42 comprises an inner plate 43 (or inner member 43)—with reference to the collection chamber 14 of the filter housing 12—and an outer rim 44 (or outer member 44) that are both secured to the flexible membrane 40—on each side thereof—and extend in the cleaning assembly opening 38 formed in the filter housing 12 (or at least partially covers the cleaning assembly opening 38). More particularly, as represented for instance in FIG. 11, an inner edge section 39 of the flexible membrane 40 is sandwiched between the inner plate 43 (or inner member 43) and the outer rim 44 (or outer member 44) of the mobile diaphragm 42. In the embodiment shown, the inner plate 43 has a substantially circular cross-section and has a diameter d1 (corresponding to a diameter of the mobile diaphragm 42) that is smaller than the opening diameter d2 of the circular cleaning assembly opening 38 formed in the filter housing 12. It is appreciated that the shape (or cross-section) of the inner plate 43 and the cleaning assembly opening 38 can vary from the embodiment shown. As represented in FIG. 12, the outer rim 44 (or outer member 44) comprises an annular peripheral rim 45 having a diameter substantially equal to the diameter d1 of the inner plate 43 (or inner member 43). The outer member 44 further comprises an annular body 47 extending transversally from an inner edge of the annular peripheral rim 45. The outer rim 44 further comprises a reinforcing body 49 mounted to the annular body 47 and extending inwardly in the outer rim 44 (and more particularly surrounded by the annular body 47). It is understood that the outer rim 44—and in particular its annular body 47—is shaped so as not to tear or impair the flexible membrane 40. The reinforcing body 49 is configured to strengthen the outer rim 44. As represented in FIGS. 10 and 11, the outer member 44 and the inner member 43 of the vibrable diaphragm 42 are secured together, for instance via rivets, so as to sandwich between them the flexible membrane 40 (and more particularly the inner edge section 39 thereof). The outer member 44 and the inner member 43 of the vibrable diaphragm 42 are thus both secured to the filter housing 12 via the flexible membrane 40. It is appreciated that the shape, the configuration, and the shape, design and number of the components of the mobile (or vibrable) diaphragm 42 can vary from the embodiment shown.

Moreover, the actuation system 80 of the filter cleaning assembly 18 further comprises an actuation member 79 secured to the diaphragm assembly 90 to engage the diaphragm assembly 90 into at least one of vibration and displacement upon actuation of the actuation system 80. In the first embodiment shown, the actuation member 79 of the actuation system 80 comprises an upper conical element 46 (or upper actuation member 46) and a lower conical element 48 (or lower actuation member 48). The upper and lower actuation members 46, 48 are both substantially cone-shaped, in the embodiment shown, and are secured to each other in a spaced-apart configuration. In the embodiment shown, the lower conical element 48 has an outer peripheral edge section 72 (or outer periphery 72) superposed to an outer face 74 of the flexible membrane 40. In other words, the actuation system 80 is secured to the flexible membrane 40 of the diaphragm assembly 90. In the embodiment shown, as represented in particular in FIGS. 10 and 11, considered along a radial direction and starting from the center of the cleaning assembly opening 38, the flexible membrane 40 comprises the inner edge section 39 sandwiched between the outer rim 44 and the inner plate 43 of the vibrable (or mobile) diaphragm 42. The flexible membrane 40 further comprises an outer peripheral edge section 41 sandwiched between the outer face 23 of the top surface 22 of the filter housing 12 and the outer peripheral edge section 72 of the lower conical element 48. In the embodiment shown, as represented in FIG. 8, the lower conical element 48 has through openings 9 formed in an outer periphery 53 (or in the outer peripheral edge section 72 thereof, in the embodiment shown), the through openings 9 facing corresponding openings 51 formed in the outer peripheral edge section 41 of the flexible membrane 40, so as to secure the flexible membrane 40 and the lower conical element 48 together to the filter housing 12.

Figure 8:
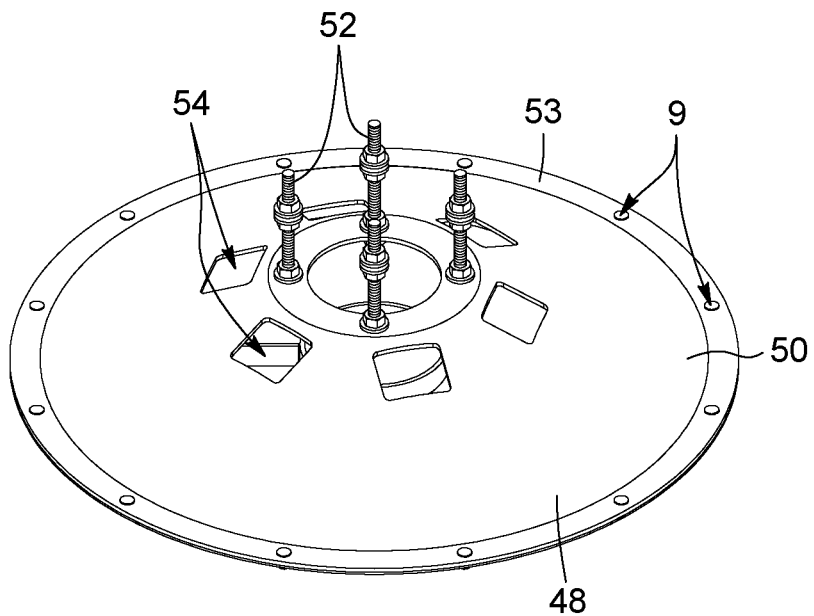
FIG. 8 is a top perspective view of a lower actuation member of the actuation system of FIG. 6.
Figure 9:
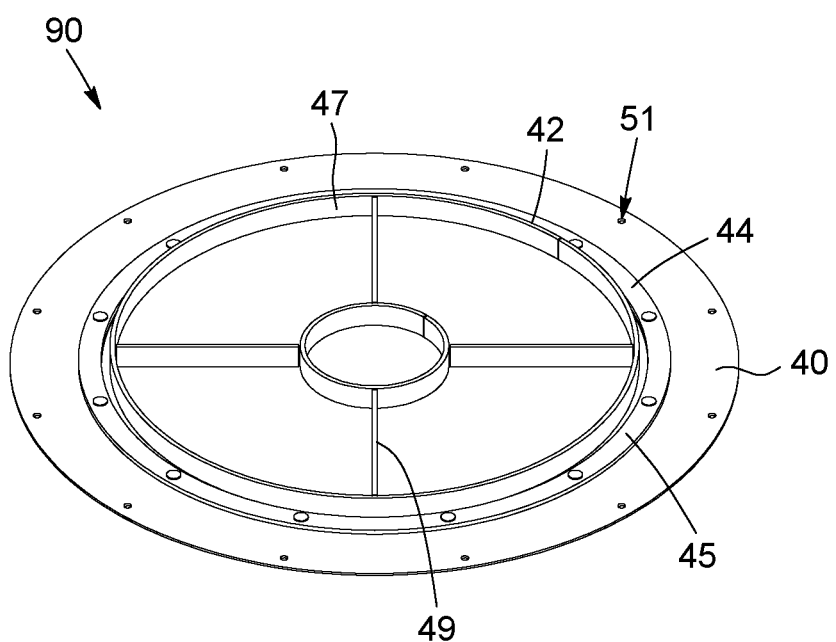
FIG. 9 is a top perspective view of the diaphragm assembly of FIG. 6.

As represented in FIG. 8, the lower conical element 48 has an outer face 50. The filter cleaning assembly 18 further comprises mounting rods 52 mounted to the lower conical element 48 and protruding outwardly from the outer face 50 of the lower conical element 48. In the embodiment shown, the mounting rods 52 extend substantially parallel to one another and are located in a central portion of the outer face 50 of the lower conical element 48. Through openings 54 are further formed in the lower conical element 48. The lower conical element 48 and the upper conical element 46 are configured to store an amount of air in the vicinity of the flexible membrane 40 and cover the flexible membrane 40 for protection thereof. The lower and upper actuation members 48, 46 are further shaped and designed to at least partially cover the mobile—or vibrable—diaphragm 42. In other words, in the first embodiment of the air filtration system 10, the actuation system 80 defines a diaphragm receiving cavity containing at least partially the diaphragm assembly 90.

The upper conical element 46 is mounted to the lower conical element 48 via the mounting rods 52, extends above the outer face 50 of the lower conical element 48 and is substantially vertically spaced from the lower conical element 48. In the embodiment shown, the lower and upper conical elements 48, 46 have substantially similar dimensions and are concentrically mounted to the filter housing 12 above the cleaning assembly opening 38 formed in the filter housing 12. In the embodiment shown, the lower and upper conical elements 48, 46 of the actuation member 79 are also concentric with the cleaning assembly opening 38. It is thus understood that the upper conical element 46, the lower conical element 48 and the flexible membrane 40 are mounted to the filter housing 12 in a substantially concentric manner. Moreover, it is understood that the diaphragm assembly 90 comprising the vibrable diaphragm 42 and the flexible membrane 40 is operatively connected to the actuation system 80 comprising the upper and lower conical elements 46, 48 that are positioned on an upper portion of the filter housing 12, protruding outwardly from the upper wall 22.

The mobile diaphragm 42 is engageable into at least one of vibration and displacement upon actuation of the actuation system 80. For instance, the diaphragm 42 is configured to be engaged into vibration upon displacement of the lower and upper conical elements 48, 46 along a displacement axis extending substantially parallel to the mounting rods 52, as represented by the two arrows in FIG. 6. In other words, the actuator of the actuation system 80 is configured to engage the lower and upper conical elements 48, 46 into vibration or displacement along the above-mentioned displacement axis. The displacements/vibrations of the lower and upper conical elements 48, 46 are thus transferred to the mobile diaphragm 42, the lower and upper conical elements 48, 46 being mounted to the top wall 22 of the filter housing 12. Then, the vibrable diaphragm 42 is engaged into vibration/displacement, the vibrations/displacement of the lower and upper conical elements 48, 46 being transferred firstly to the flexible membrane 40, and then to the vibrable diaphragm 42 via the flexible membrane 40.

The vibration of the diaphragm assembly 90 should thus be understood as referring to a periodic motion of at least some of the components of the diaphragm assembly 90 in alternately opposite directions from a position of equilibrium when that equilibrium has been disturbed (upon actuation of the actuator of the actuation system 80, in the embodiment shown, i.e. upon vibration of the actuation members 46, 48 of the actuation system 80).

It is appreciated that the shape, the configuration, and the location of the actuation system 80, and in particular the shape, the number and the location of the actuation member 79 comprising the upper and lower actuation members 46, 48 can vary from the embodiment shown. The present disclosure is obviously not limited to an actuation member 79 comprising two substantially cone-shaped actuation members.

As mentioned above, the filter cleaning assembly 18 is configured to displace air in the collection chamber 14 of the filter housing 12 so as to remove particulate matter from the filter 16. In other words, the actuation of the actuation system 80 allows the generation of repetitive air pulses by the vibration and/or displacement of at least one of the flexible membrane 40 and the vibrable diaphragm 42 of the diaphragm assembly 90. In the embodiment shown, the air pulses are generated in a direction opposed to the circulation of the air flow during filtration performed by the air filtration system, i.e. in a direction opposed to the circulation of the air flow from the air inlet 26 towards the air outlet 30. In yet other words, the upper and lower conical elements 46, 48 (or upper and lower actuation members 46, 48 of the actuation member 79 of the actuation system 80), the flexible membrane 40 and the vibrable diaphragm 42 are all configured to be vibrated/displaced upon actuation of the actuator of the actuation system 80 so as to displace an amount of air in the collection chamber 14 to remove particulate matter from the filter 16. In yet other words, and as represented in FIG. 4, the filter 16 separates the collection chamber into an inlet side 76 and an outlet side 78 directed respectively towards the air inlet 26 and the air outlet 28; the cleaning assembly opening 38 is located at the outlet side 78 of the collection chamber 14. It is thus understood that the diaphragm assembly 90 of the filter cleaning assembly 18 has a configuration similar to the vibrating diaphragm of a loudspeaker: upon reception of the signal from the actuation system 80, the diaphragm assembly 90 displaces an amount of air in the collection chamber 14 of the filter housing 12 at a predetermined frequency. In some embodiments, the actuation system 80 is configured to generate repetitive air pulses during a duration comprised between about 1 second and about 4 seconds. In some other embodiments, the actuator is configured to generate repetitive air pulses during a duration comprised between about 1.5 seconds and about 2.5 seconds. In some embodiments, the actuation system 80 is configured to generate air pulses having a frequency comprised between about 5 Hz and about 200 Hz. In some other embodiments, the actuation system 80 is configured to generate air pulses having a frequency comprised between about 10 Hz and about 150 Hz. In some other embodiments, the actuation system 80 is configured to generate air pulses having a frequency comprised between about 15 Hz and about 120 Hz. In yet some other embodiments, the actuation system 80 is configured to generate air pulses having a frequency comprised between about 20 Hz and about 100 Hz.

It is thus understood that the filter cleaning assembly 18 according to the present disclosure makes it possible to reduce the maintenance frequency of the air filtration system 10, and to reduce the fuel consumption when the air filtration system 10 is used in the air intake stream of a combustion engine. Moreover, the filter cleaning assembly 18 also makes it possible to reduce a pressure increase at the combustion engine intake and to allow an engine operation within a substantially constant pressure interval, when the air filtration system 10 is used in the air intake stream of a combustion engine. It is to be noted that the cleaning of the filter 16 by the filter cleaning assembly 18 of the present disclosure does not require the removal of the filter 16 out of the collection chamber 14. The maintenance requirements of the air filtration system 10 are thus reduced and the efficiency of the air filtration system 10 is improved.

The air filtration system 10 of the present disclosure may further comprise a control assembly (not represented) to control the actuation of the actuation system 80. The control assembly is configured to monitor the operating variable(s) and to actuate the actuation system 80 according to predetermined cleaning condition(s), such as the pressure within the collection chamber 14 or the rotation speed of the motor—or engine speed—when the air filtration system 10 is used in the air intake stream of a combustion engine. In some embodiments, the control assembly is configured to actuate the actuation system 80 when the rotation speed of the motor is slower than about 1500 RPM. In some other embodiments, the controller is configured to actuate the actuation system 80 when the rotation of the motor is slower than about 950 RPM.

The control assembly can include a controller operatively connected to the actuation system 80, one or more sensor(s) operatively connected to the controller and configured to monitor one or more operating variable(s) of the air filtration system, wherein the controller actuates the actuation system when the monitored operating variable(s) correspond(s) to predetermined cleaning condition(s). In an embodiment, the one or more sensor(s) can include a pressure sensor monitoring pressure in the collection chamber and the monitored operating variable can comprise a pressure variation within the collection chamber on each side of the filter.

As mentioned above, as the particulate matter accumulates on the filter 16, the pressure difference between the air inlet 26 and the air outlet 30 tends to increase; the predetermined cleaning conditions could thus include a threshold relating to an acceptable pressure difference. In some embodiments, the controller is configured to actuate the actuation system 80 when the pressure difference is greater than about 10 poH2O, for instance. In some other embodiments, the controller is configured to actuate the actuator when the pressure difference is greater than 15 poH2O. The predetermined cleaning conditions might further depend on a duration during which the pressure difference is greater than a predetermined threshold and/or during which the rotation speed of the motor, if any, is smaller than a predetermined threshold. The predetermined cleaning conditions might further depend on the type of vehicle and/or motor equipped with the air filtration system 10 according to the present disclosure. In some implementations, the filter cleaning assembly 18 is configured to be actuated when the pressure difference is greater than a predetermined threshold and/or during which the rotation speed of the motor is smaller than a predetermined threshold, the actuation lasting until the pressure difference becomes smaller than the predetermined threshold and/or until the rotation speed of the motor becomes greater than the predetermined threshold.

Figure 13:
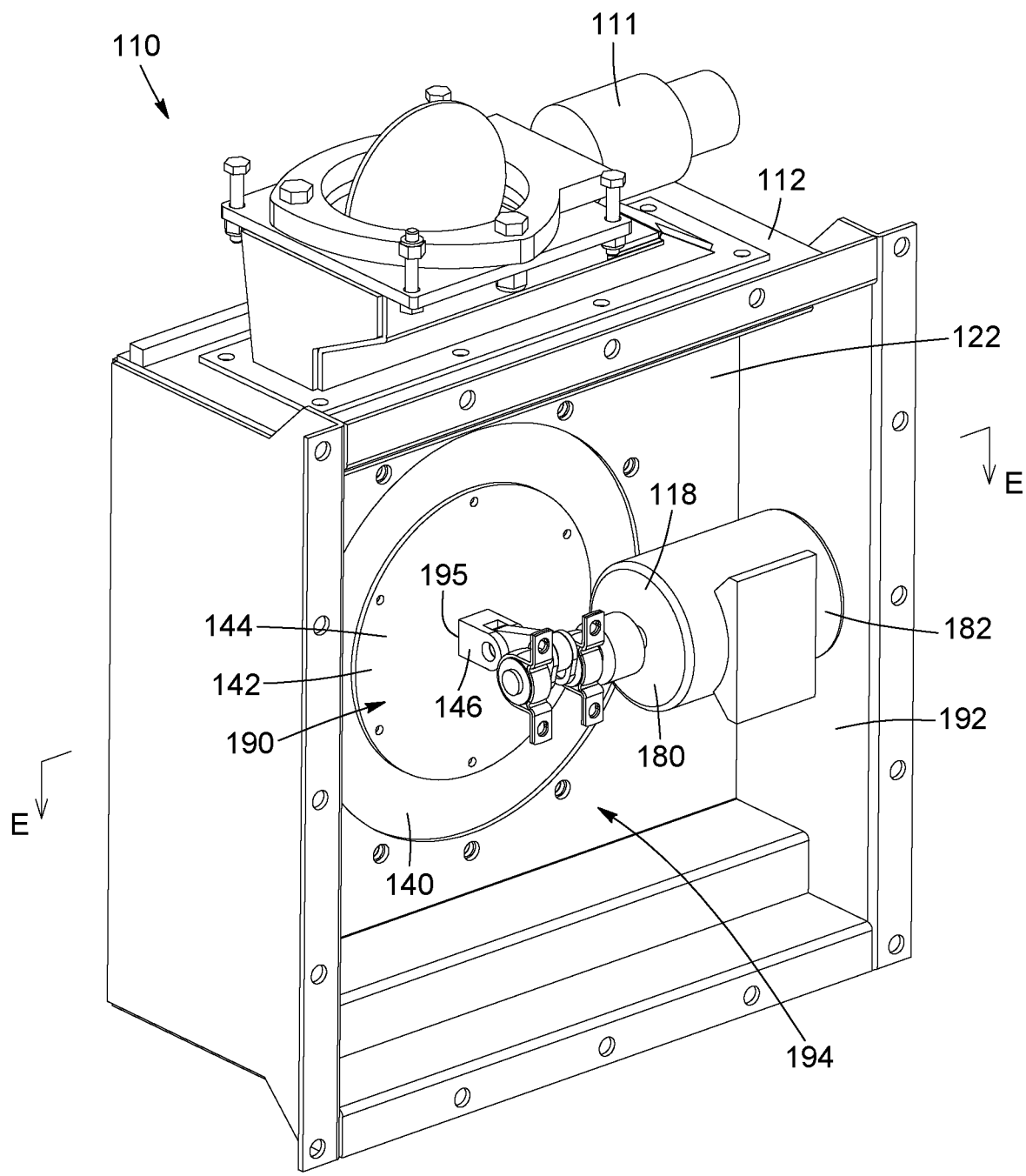
FIG. 13 is a top perspective view of a second embodiment of an air filtration system comprising a filter and a filter cleaning assembly.
Figure 14:
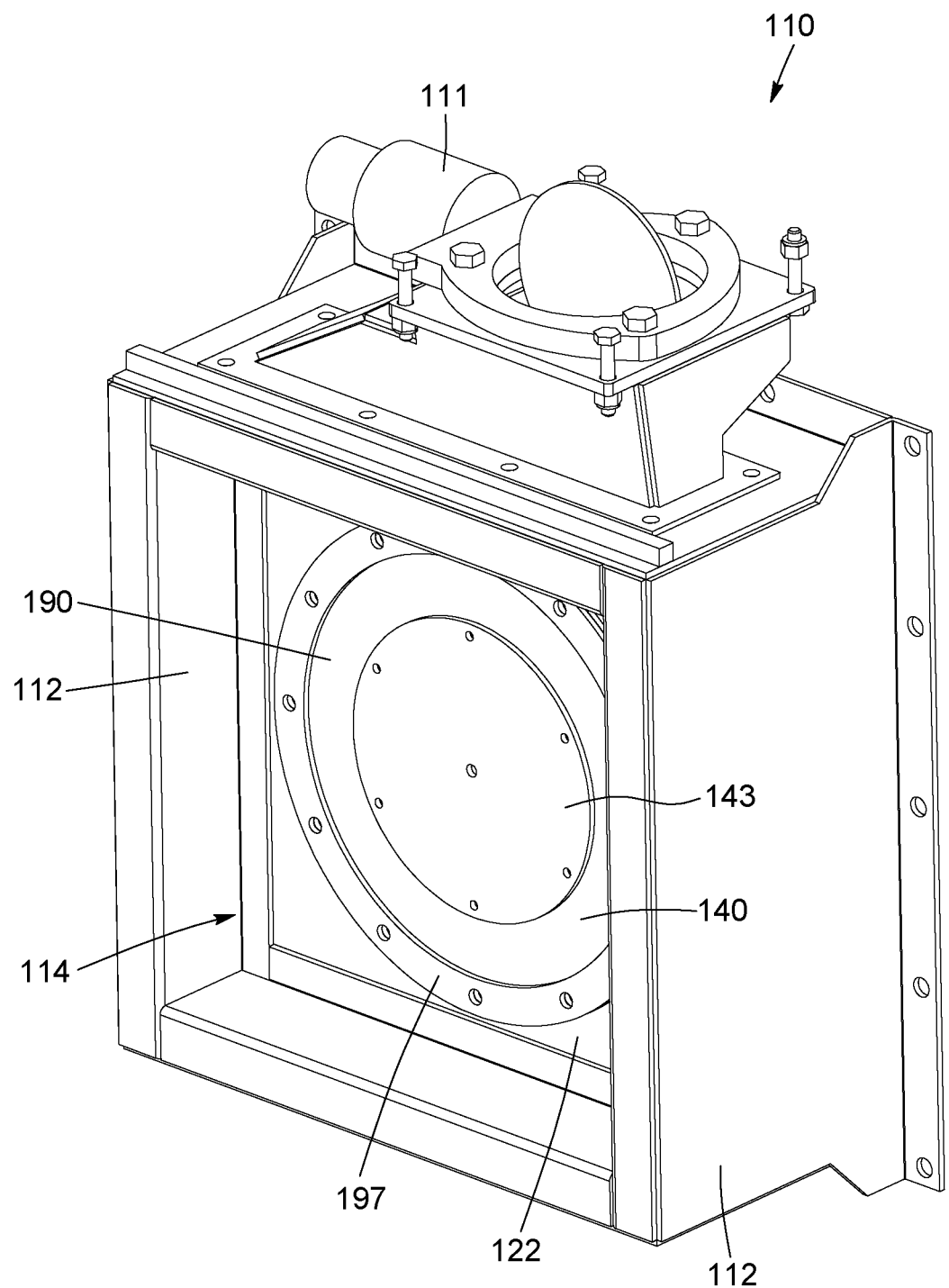
FIG. 14 is a bottom perspective view of the air filtration system of FIG. 13, the filter being removed.
Figure 15:
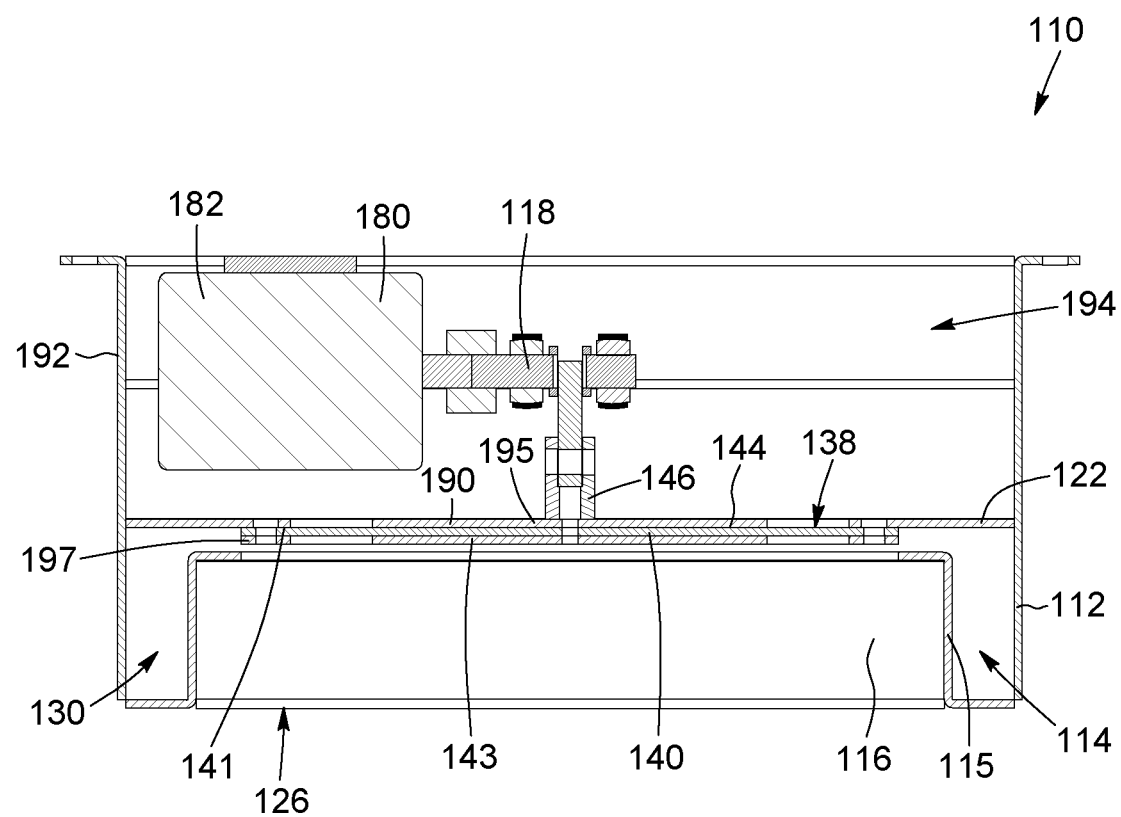
FIG. 15 is a sectional view taken along cross-section lines E-E of the air filtration system of FIG. 13.
Figure 16:
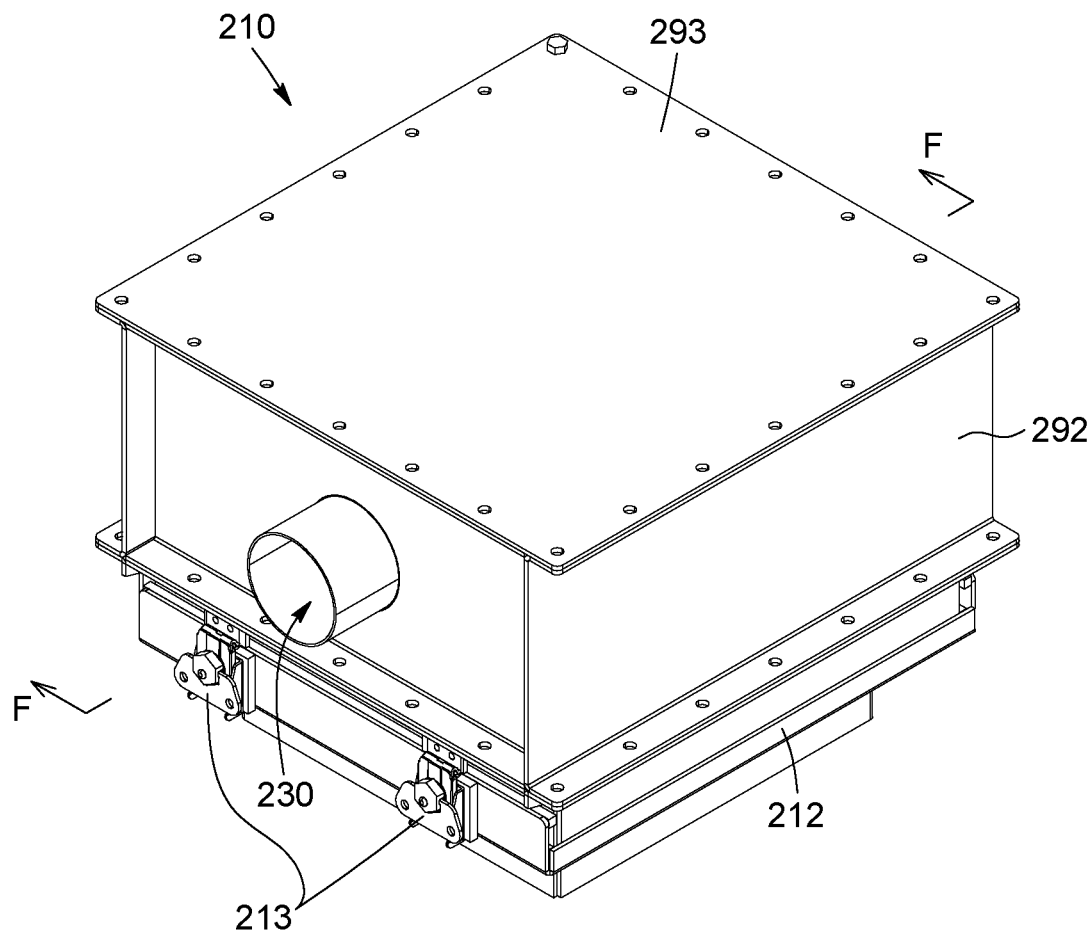
FIG. 16 is a top perspective view of a third embodiment of an air filtration system comprising a filter and a filter cleaning assembly.
Figure 17:
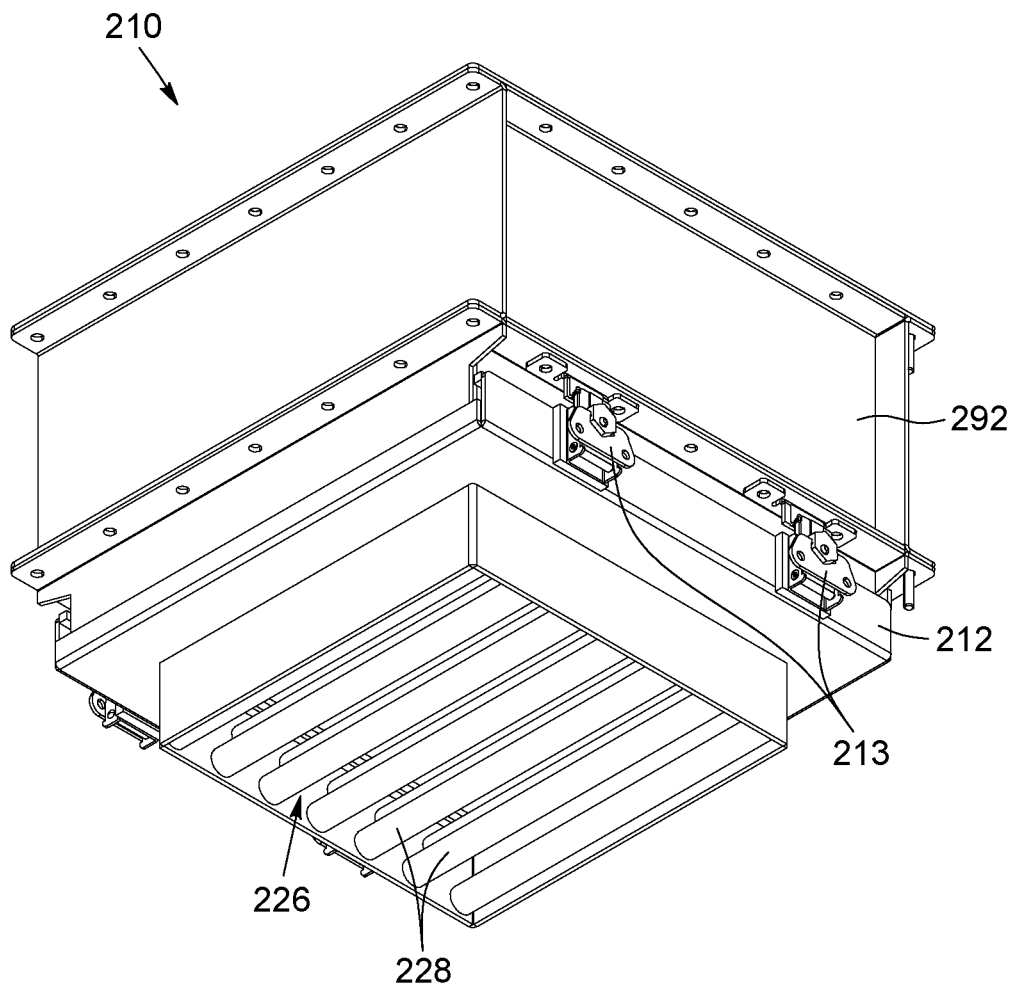
FIG. 17 is a bottom perspective view of the air filtration system of FIG. 16.
Figure 18:
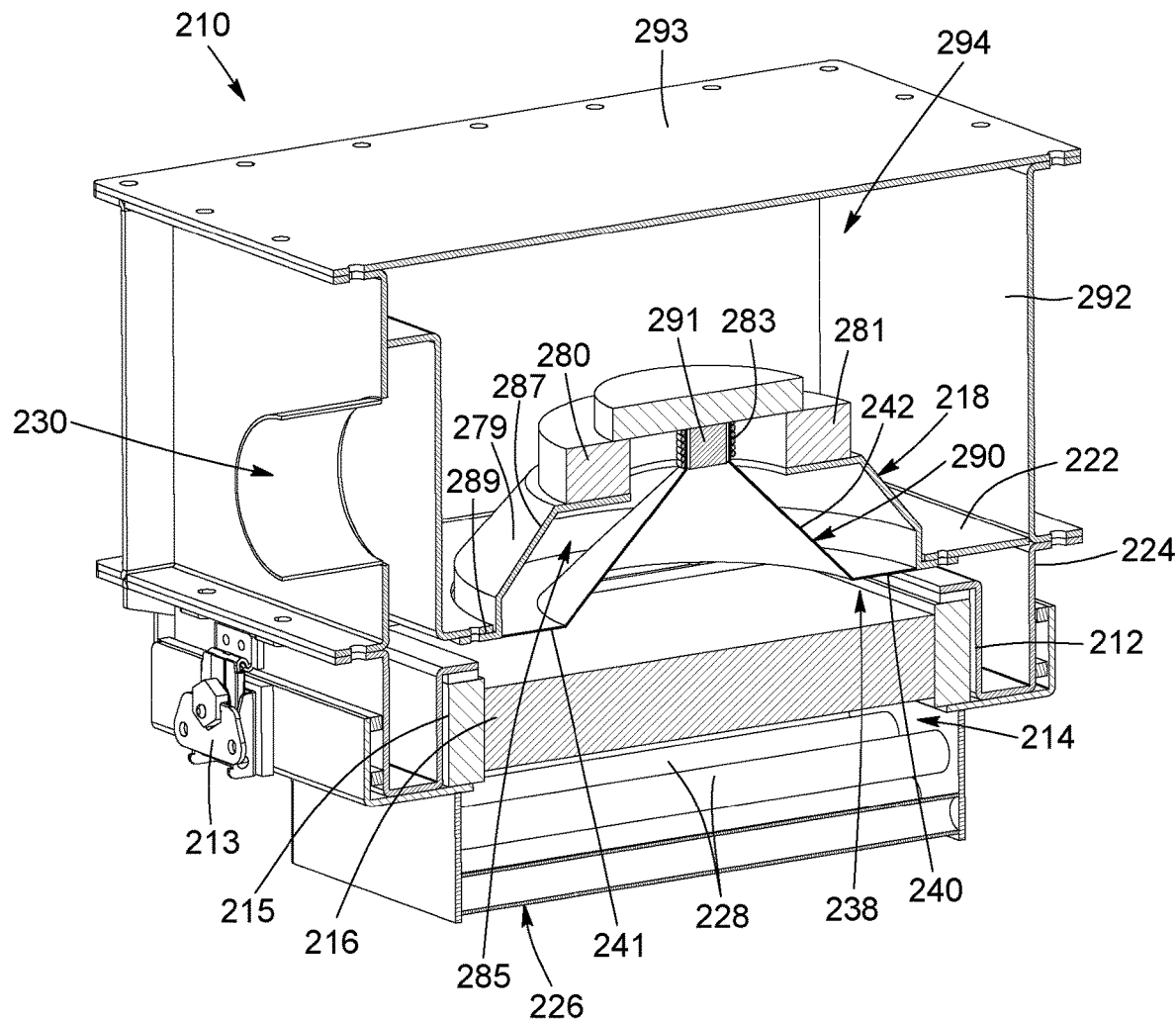
FIG. 18 is a sectional view taken along cross-section lines F-F of the air filtration system of FIG. 16.
Figure 19:
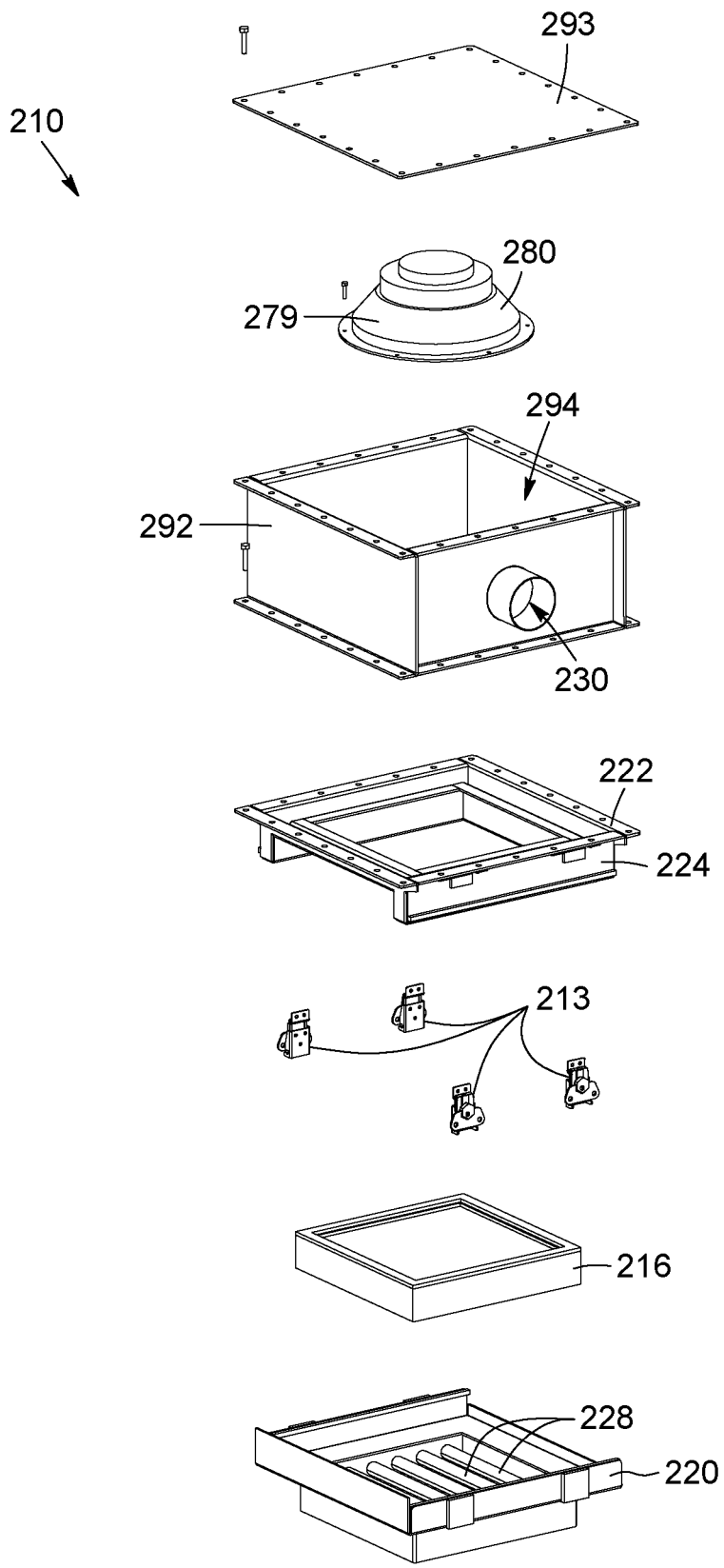
FIG. 19 is an exploded view of the air filtration system of FIG. 16.

FIGS. 13 to 15 represent a second embodiment of the air filtration system 110 comprising a filter cleaning assembly 118. Similarly to the first embodiment, the air filtration system 110 comprises a filter housing 112 defining a collection chamber 114 and comprising an air inlet 126 and an air outlet 130. A filter 116 is support by a filter support 115 mounted to the filter housing 112 and extending in the collection chamber 114, the air inlet 126 and the air outlet 130 being in fluid communication through the filter 116. A cleaning assembly opening 138 is formed in the filter housing 112 (for instance in a top wall 122 thereof) in fluid communication with the collection chamber 114. Similarly to the first embodiment, the filter cleaning assembly 118 comprises an actuation system 180 operatively coupled to the filter housing 112 (for instance by being secured to a cleaning assembly housing 192 mounted to an outer face of the top wall 122 of the filter housing 112). In other words, in the embodiment shown, the actuation system 180 of the filter cleaning assembly 118 is indirectly operatively coupled to the filter housing 112 of the air filtration system 110.

The cleaning assembly housing 192 defines a cleaning assembly chamber 194 shaped and dimensioned to at least partially receive the filter cleaning assembly 118. Moreover, the filter cleaning assembly 118 is arranged with regards to the cleaning assembly opening 138 so that the cleaning assembly chamber 194 and the collection chamber 114 defined by the filter housing 112 are not in fluid communication with each other.

The filter cleaning assembly 118 further comprises a diaphragm assembly 190 comprising a flexible membrane 140—substantially circular, in the embodiment shown, but could alternatively be substantially annular in shape—secured to the filter housing 112 (for instance and without being limitative to an inner face of the top wall 122 thereof) and extending in or at least partially covering the cleaning assembly opening 138. The diaphragm assembly 190 further comprises, in the embodiment shown, a membrane securing rim 197 configured to secure a portion of the flexible membrane 140 (an outer peripheral edge section 141 thereof (FIG. 15), in the embodiment shown) to the inner face of the top wall 122 of the filter housing 112. In other words, the outer peripheral edge section 141 of the flexible membrane 140 is sandwiched between the membrane securing rim 197 and the inner face of the top wall 122 of the filter housing 112.

The diaphragm assembly 190 further comprises a mobile diaphragm 142 mounted to the filter housing 112 via the flexible membrane 140. In the embodiment shown, the mobile diaphragm 142 has a substantially circular shape (or cross-section) and is secured (for instance riveted or by any other mechanical fastener) to the flexible membrane 140. In the embodiment shown, the mobile diaphragm 142 comprises an inner member 143 (or inner plate 143, the term inner being understood with regards to the collection chamber 114 of the filter housing 112) and an outer member 144 (or outer plate 144) extending in the cleaning assembly chamber 194. In the embodiment shown, both the inner and outer members 143, 144 have a substantially circular shape. A portion (a central portion, in the embodiment shown) of the flexible membrane 140 is sandwiched between the inner and outer members 143, 144.

In the embodiment shown, the cleaning assembly opening 138, the flexible membrane 140 and the inner and outer members 143, 144 of the mobile diaphragm 142 are substantially concentrically mounted. The diaphragm assembly 190 (i.e. at least one of the flexible membrane 140 and the mobile diaphragm 142) is engageable into at least one of vibration and displacement upon actuation of the actuation system 180 for the diaphragm assembly 190 to displace air in the collection chamber 114 so as to remove particulate matter from the filter 116.

In the embodiment shown, the actuation system 180 comprises an actuator 182 (such as a hydraulic cylinder or a pneumatic cylinder) and an actuation member 146 operatively coupled via a first end to the actuator 182 (and thus operatively coupled to the filter housing 112 via the cleaning assembly housing 192). The actuation member 146 is mounted via a second end to a substantially central portion 195 of the mobile diaphragm 142 (and more particularly to a substantially central portion of the outer member 144 thereof).

In the second embodiment shown, and contrary to the first embodiment described above, the actuation system 180 of the filter cleaning assembly 118 does not comprise upper and lower conical elements (or upper and lower actuation members). It is thus understood that these two elements, described above with reference to FIGS. 1 to 12, should be considered as being optional.

FIGS. 16 to 19 represent a third embodiment of the air filtration system 210 comprising a filter cleaning assembly 218. Similarly to the first and second embodiments, the air filtration system 210 comprises a filter housing 212 defining a collection chamber 214 and comprising an air inlet 226 and an air outlet 230. In the embodiment shown, the filter housing 212 comprises a top wall 222, a bottom wall 220 (FIG. 19) having a plurality of spaced-apart rods 228 extending substantially parallel to each other. The filter housing 212 further comprises a plurality of side walls 224 extending between the bottom wall 220 and the top wall 222 and mounted thereto. The air inlet 226 is defined by the spaces defined between adjacent ones of the spaced-apart rods 228. It is appreciated that the shape, the configuration, and the location of the air inlet 226 can vary from the embodiment shown.

A filter 216 is supported by a filter support 215 mounted to the filter housing 212 and extending in the collection chamber 214, the air inlet 226 and the air outlet 230 being in fluid communication through the filter 216. For instance, the different components of the filter housing 212 are removably assembled together to easily remove the filter 216 out of the collection chamber 214. Similarly to the first embodiment, the air filtration system 210 comprises locking members 213 configured to lock the filter housing 212 in the closed configuration.

Similarly to the second embodiment, the air filtration system 210 comprises a cleaning assembly housing 292. For instance and without being limitative, the cleaning assembly housing 292 has a substantially rectangular block shape and is mounted to the top wall 222 (to an outer face thereof) of the filter housing 212. The cleaning assembly housing 292 defines a cleaning assembly chamber 294. Similarly to the second embodiment, the cleaning assembly chamber 294 is shaped and dimensioned to at least partially receive the filter cleaning assembly 218. For instance, the cleaning assembly housing 292 comprises a cover 293 removably mounted to side walls of the cleaning assembly housing 292 to provide access to the cleaning assembly chamber 294. For instance, the locking members 213 are further configured to connect together the filter housing 212 and the cleaning assembly housing 292.

A cleaning assembly opening 238 is formed in the filter housing 212 (for instance in the top wall 222 thereof). The cleaning assembly opening 238 is in fluid communication with the collection chamber 224. As detailed below, and similarly to the second embodiment, the filter cleaning assembly 218 is arranged with regards to the cleaning assembly opening 238 so that the cleaning assembly chamber 294 and the collection chamber 214 defined by the filter housing 212 are not in fluid communication with each other.

Similarly to the first and second embodiments, the filter cleaning assembly 218 comprises an actuation system 280 operatively coupled to the filter housing 214 (for instance by being mounted to the outer face of the top wall 222 of the filter housing 212). The filter cleaning assembly 218 further comprises a diaphragm assembly 290 comprising a flexible membrane 240 (for instance having a substantially annular shape but could also be substantially circular in shape) secured to the filter housing 212 (for instance and without being limitative to an inner face of the top wall 222 thereof) and extending in or at least partially covering the cleaning assembly opening 238. The diaphragm assembly 290 further comprises a mobile diaphragm 242 mounted to the filter housing 212 via the flexible membrane 240.

In the embodiment shown, the actuation system 280 and the diaphragm assembly 290 have a structure substantially similar to the one of a loudspeaker. For instance and without being limitative, the actuation system 280 comprises a magnet 281 and a coil 283, the coil 283 surrounding a top portion 291 of the mobile diaphragm 242.

In the embodiment shown, the mobile diaphragm 242 is substantially cone-shaped and is secured (for instance riveted or by any other mechanical fastener) to an outer face of an inner edge section of the flexible membrane 240. In the embodiment shown, the cleaning assembly opening 238, the flexible membrane 240, the mobile diaphragm 242 and the actuation system 280 are substantially concentrically mounted to the filter housing 212. The diaphragm assembly 290 (i.e. at least one of the flexible membrane 240 and the mobile diaphragm 242) is engageable into at least one of vibration and displacement upon actuation of the actuation system 280 for the diaphragm assembly 290 to displace air in the collection chamber 214 so as to remove particulate matter from the filter 216.

In the embodiment shown, the actuation system 280 comprises a diaphragm housing 279 defining a diaphragm receiving cavity 285 shaped and dimensioned to at least partially receive the diaphragm assembly 290. The diaphragm housing 279 comprises a peripheral wall portion 287 at least partially outwardly delimiting the diaphragm receiving cavity 285 and a base 289 extending outwardly from an outer face of the peripheral wall portion 287. The diaphragm assembly 290 comprises an outer peripheral edge section (corresponding for instance to the outer peripheral edge section 241 of the flexible membrane 240) secured to the base 289 of the diaphragm housing 279. For instance and without being limitative, the diaphragm assembly 290 is operatively coupled to the filter housing 212 via the outer peripheral edge section 241 of the flexible membrane 240 that is sandwiched between an inner face of the base 289 and the outer face of the top wall 222 of the filter housing 212.

It is appreciated that the shape, the configuration, the structure and the relative location of the actuation system 280 and the diaphragm assembly 290 can vary from the embodiment shown.

As represented in FIGS. 20 to 25, a plurality (for instance and without being limitative two or four) air filtration systems 110 may be combined together so as to form an air filtration assembly 500, 600, 700. In the embodiment shown, the assembled air filtration systems 110 correspond to the second embodiment described above, but any other type of air filtration system could be combined, or air filtration systems of different embodiments could be combined.

Figure 20:
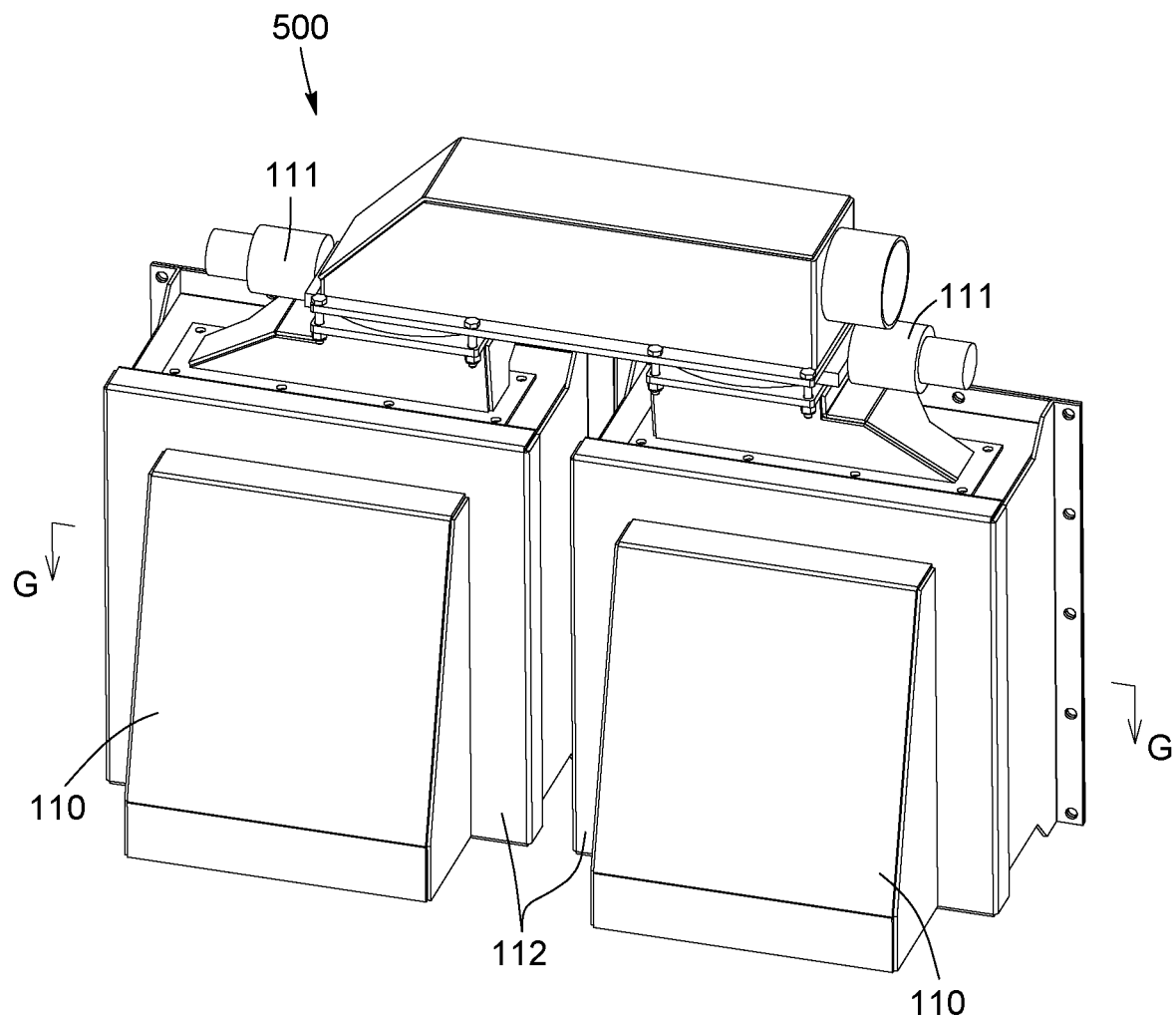
FIG. 20 is a side perspective view of a first embodiment of an air filtration assembly comprising two air filtration systems arranged side by side.
Figure 21:
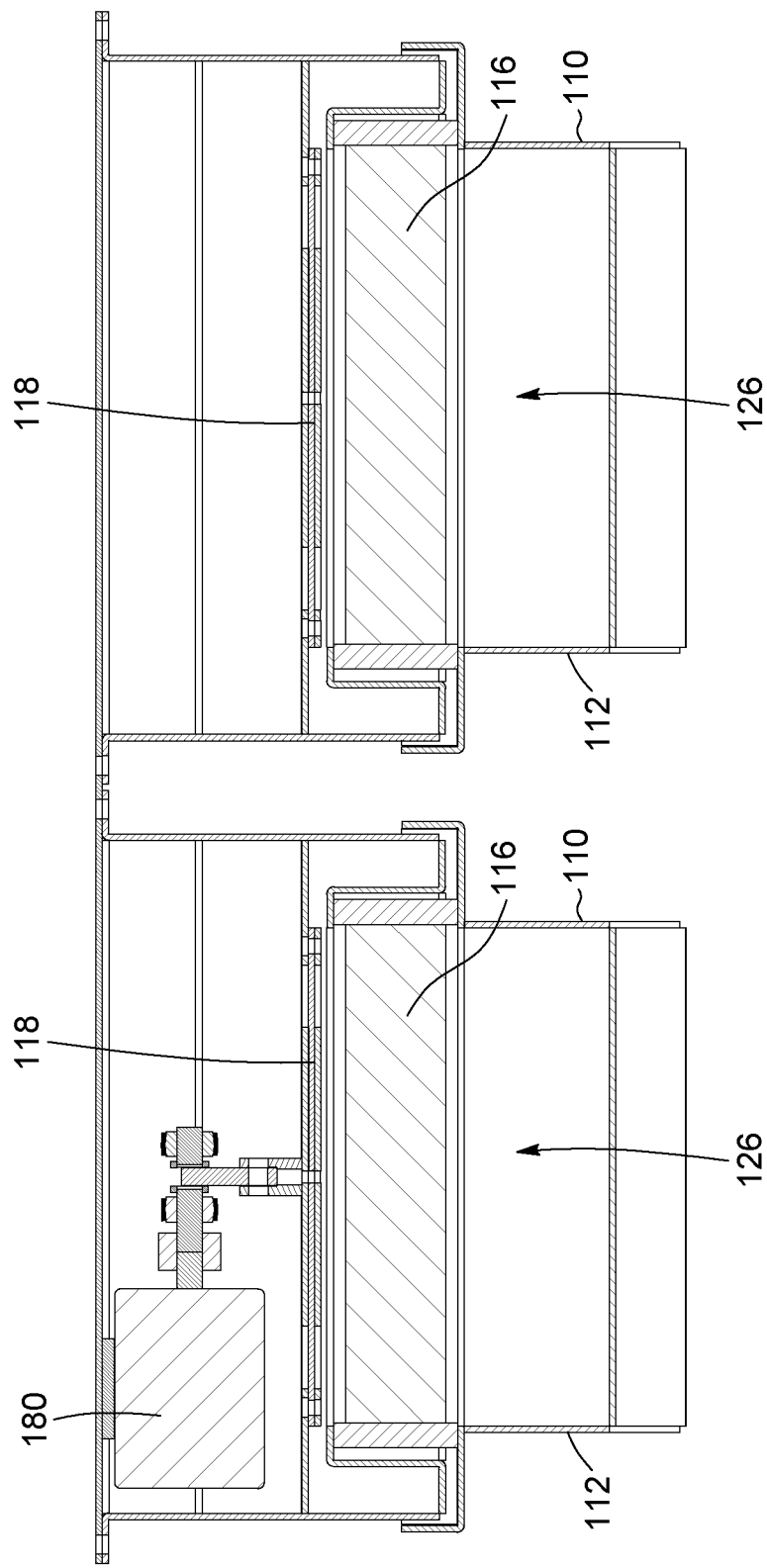
FIG. 21 is a sectional view taken along cross-section lines G-G of the air filtration assembly of FIG. 20.
Figure 22:
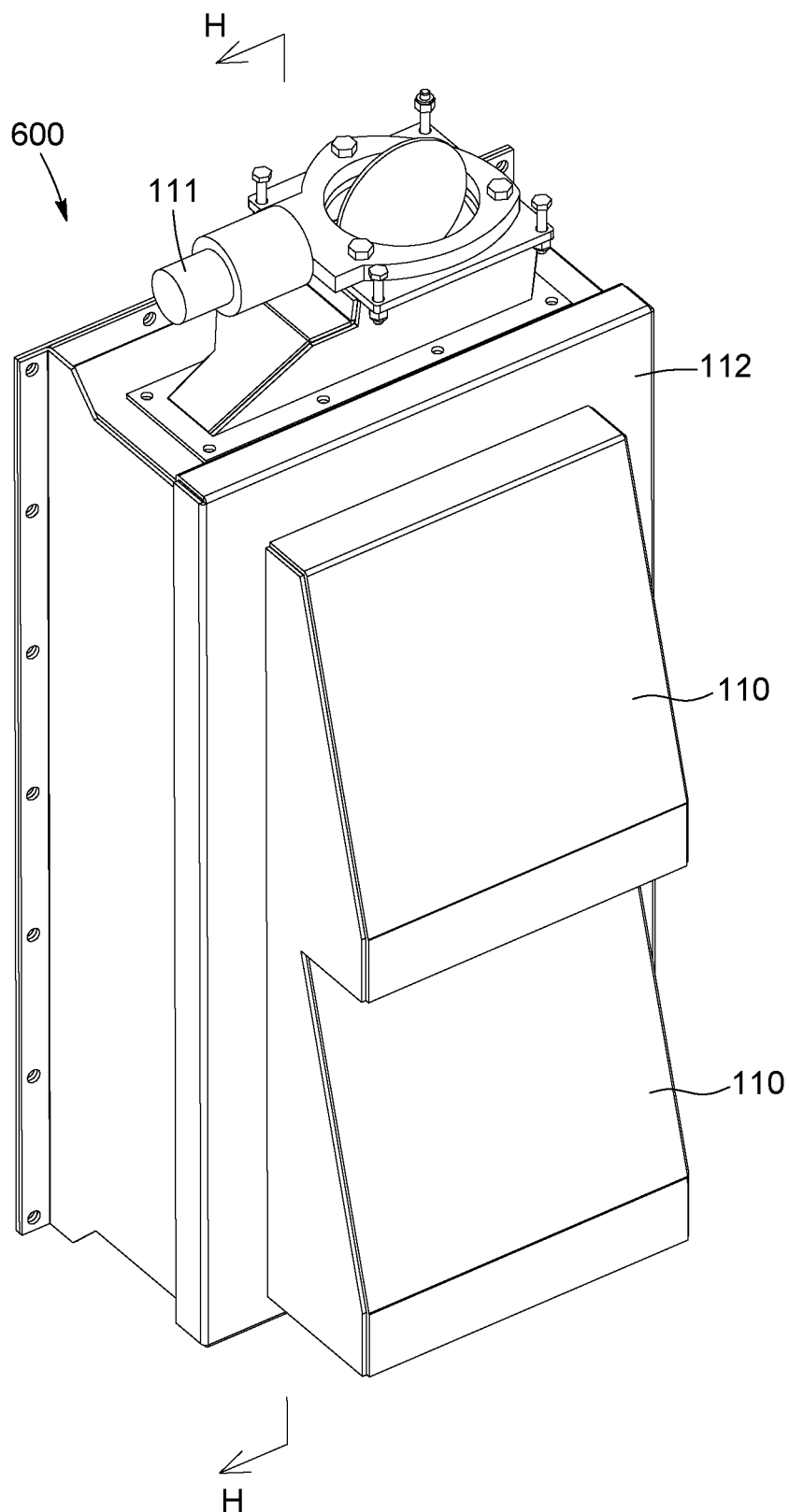
FIG. 22 is a side perspective view of another embodiment of an air filtration assembly comprising two air filtration systems arranged one on top of the other.
Figure 23:
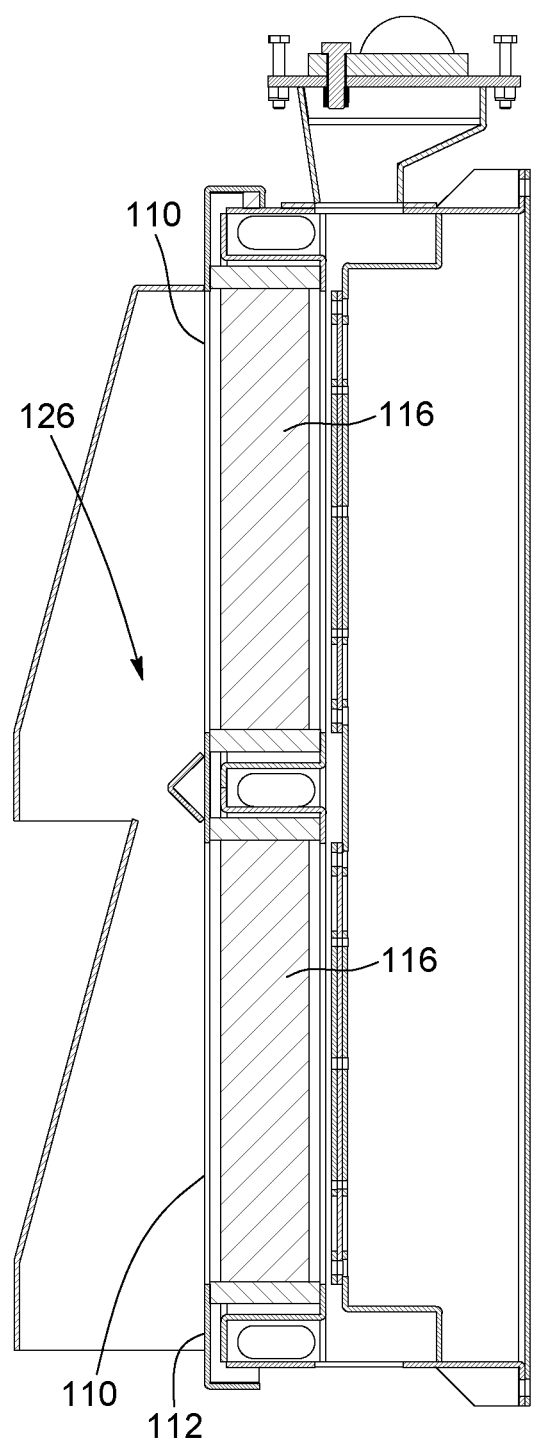
FIG. 23 is a sectional view taken along cross-section lines H-H of the air filtration assembly of FIG. 22.

In the embodiments of the air filtration assembly 500, 600 comprising two air filtration systems, the two air filtration systems 110 may be arranged side by side, as in the air filtration assembly 500 represented in FIGS. 20 and 21, or may be arranged one on top of the other, as in the air filtration assembly 600 represented in FIGS. 22 and 23. The air filtration systems 110 can either comprise two distinct filter housings 112 (as in FIGS. 20 and 21) or can comprise one single filter housing 112 (as in FIGS. 22 and 23) defining a single collection chamber 114 in which the two filters 116 are mounted. The air filtration systems 110 can comprise one actuation system 180 actuating the two filter cleaning assemblies 118 (FIGS. 20 and 21) or can comprise as many actuation systems 180 as filter cleaning assemblies 118.

As represented in FIG. 20, each one of the air filtration systems 110 can include an airflow regulator 111, such as a valve or a pump, mounted upstream of the respective filter 116. In some embodiments, the controller is operatively connected to the airflow regulators to control same at least between an air filtering (open) configuration and a cleaning (closed) configuration. When a pressure variation between both sides of the filter 116 is above a pressure variation threshold (for instance, the pressure variation can be monitored through a pressure sensor operatively connected to the controller), the controller is configured to alternatively configure each of the two air filtration systems 110 into the cleaning configuration. While one of the air filtration systems 110 is configured into the cleaning configuration, the other one of the air filtration systems 110 remains in the air filtering configuration to prevent interruption of the air filtration assembly 500 for air filtering purposes. More particularly, when the monitored pressure variation is above the pressure variation threshold, a first one of the airflow regulators is configured into the air cleaning (closed) configuration to prevent air flow through the respective one of the filters 116. Then, the actuator of the air filtration system 110 in the cleaning configuration is actuated to clean its filter 116. Once the cleaning cycle is completed, the airflow regulator is configured into the air filtering configuration and the airflow regulator of the other one of the air filtration systems 110 is configured into the cleaning configuration to carry out the cleaning cycle. Once the filter 116 of the other one of the two air filtration systems 110 has been cleaned, its airflow regulator is configured into the air filtering configuration. In other embodiments, the air filtration assembly 600 can comprise one single airflow regulator 111 in fluid communication with the different filters 116.

Figure 24:
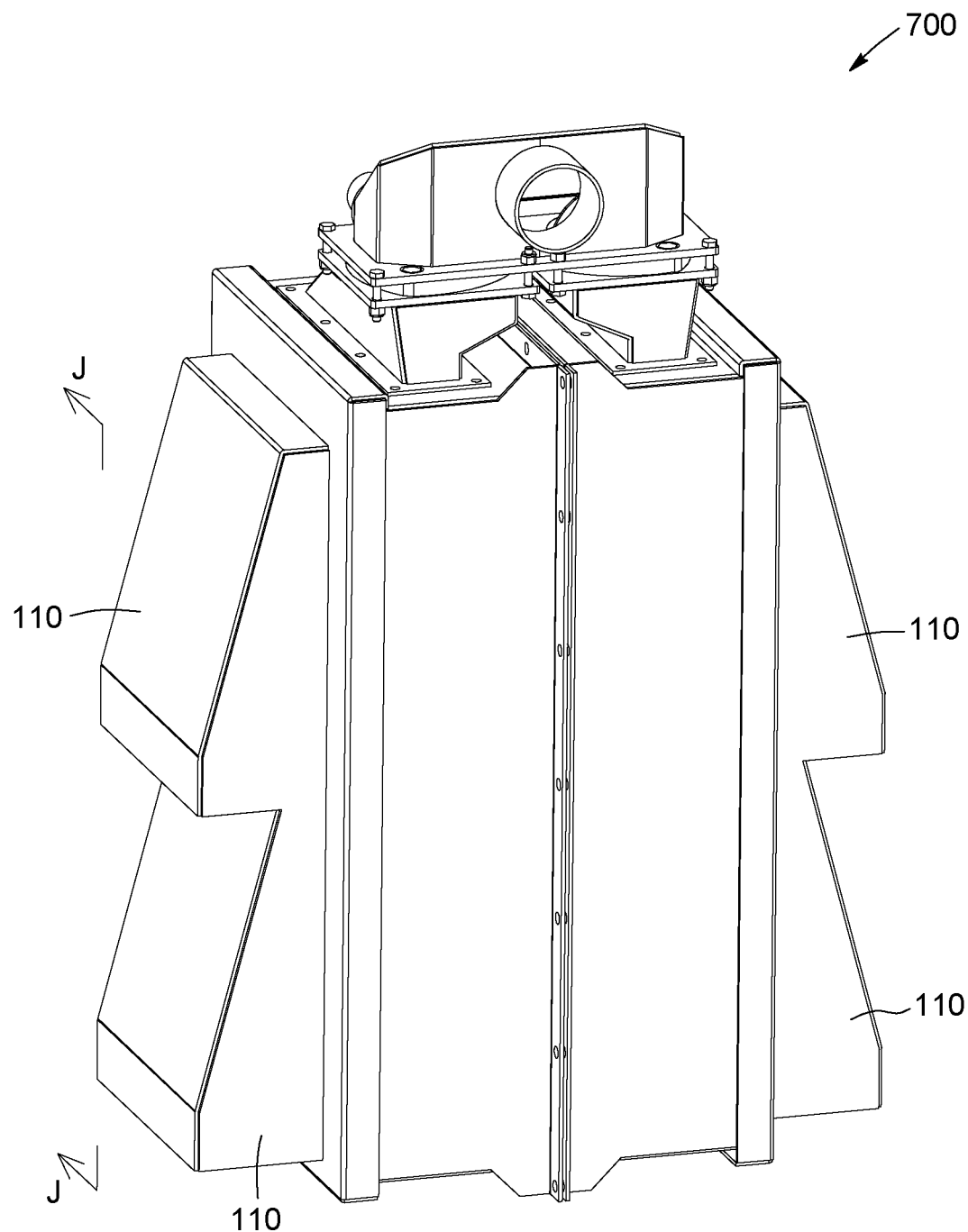
FIG. 24 is a side perspective view of another embodiment of an air filtration assembly, the air filtration assembly comprising four air filtration systems.
Figure 25:
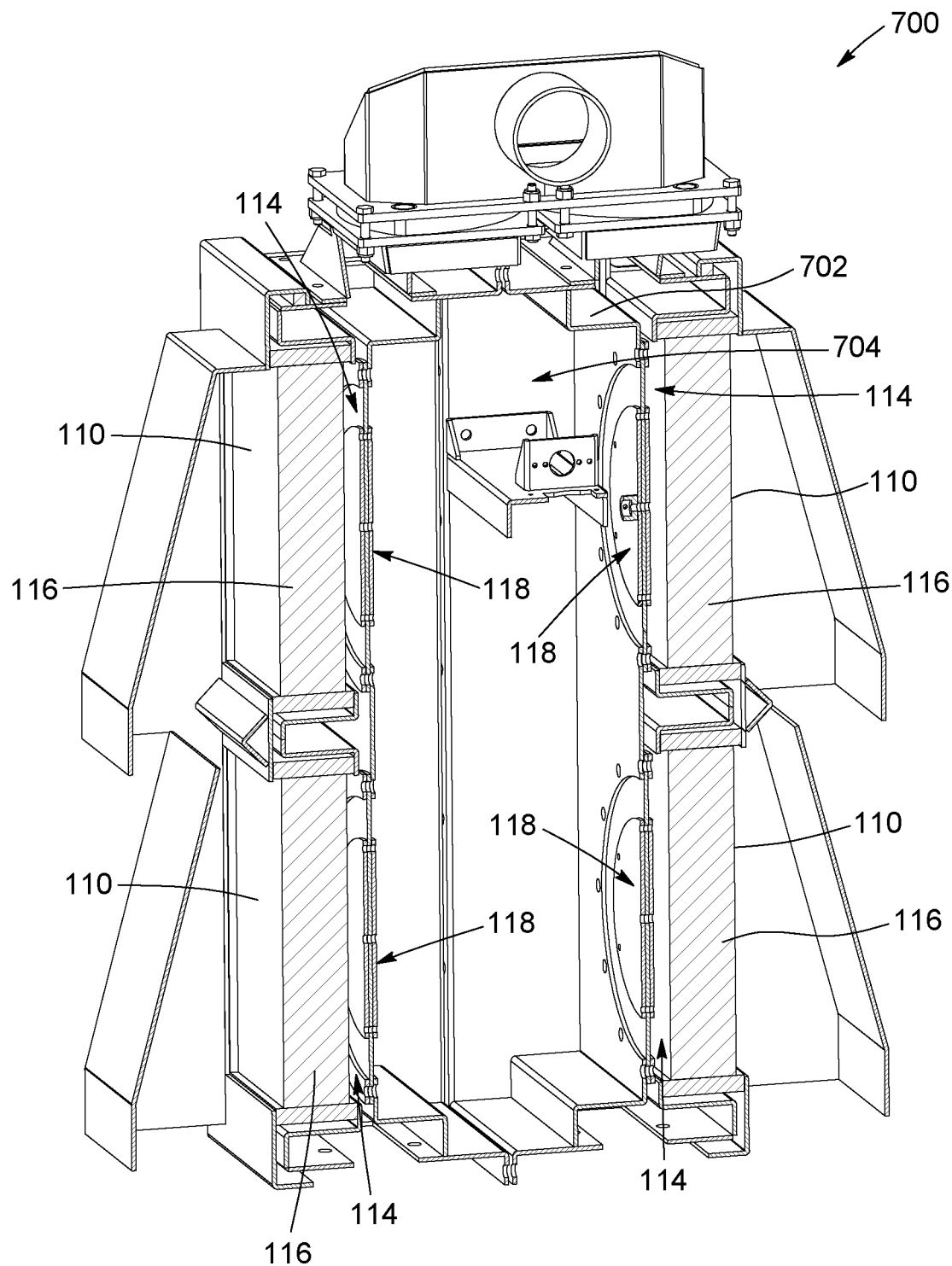
FIG. 25 is a sectional view taken along cross-section lines J-J of the air filtration assembly of FIG. 24.

As represented in FIGS. 24 and 25, the air filtration assembly 700 may comprise four air filtration systems 110. In the embodiment shown, the air filtration assembly 100 comprises two pairs of air filtration systems 110 each pair of the two air filtration systems 110 being arranged one on top of the other. In the embodiment shown, the air filtration assembly 700 comprises an assembly housing 702 defining a central cavity 704. The filter cleaning assemblies 118 of the different air filtration systems 110 are arranged so that the central cavity 704 is not in fluid communication with any of the collection chambers 114 of the air filtration systems 110. It is thus possible to access the actuation systems 180 of the filter cleaning assemblies 118 without interrupting the working of the air filtration assembly 700.

It is obviously appreciated that the number, the shape and the arrangement of the different air filtration systems 110 of the air filtration assemblies 500, 600, 700 can vary from the two embodiments shown.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. An air filtration system comprising:
a filter housing defining a collection chamber and comprising an air inlet, an air outlet and a cleaning assembly opening, the air inlet, the air outlet and the cleaning assembly opening being in fluid communication with the collection chamber;
a cleaning assembly housing defining a cleaning assembly chamber and mounted to the filter housing;
a filter support mounted to the filter housing and extending in the collection chamber, with each one of the air inlet and the air outlet being located on a respective side of the filter support; and
a filter cleaning assembly at least partially received in the cleaning assembly chamber and mounted to the filter housing, the filter cleaning assembly comprising:
an actuation system; and
a diaphragm assembly comprising:
a flexible membrane secured to the filter housing and at least partially covering the cleaning assembly opening; and
a mobile diaphragm mounted to the filter housing via the flexible membrane;
wherein the diaphragm assembly vibrates upon actuation of the actuation system so as to displace air in the collection chamber to remove particulate matter from a filter engaged with the filter support; and
wherein the filter cleaning assembly is arranged with regards to the cleaning assembly opening so that the cleaning assembly chamber and the collection chamber are not in fluid communication with each other.

2. The air filtration system according to claim 1, wherein, when the filter is engaged with the filter support, the collection chamber is separated into an inlet side and an outlet side directed respectively towards the air inlet and the air outlet, the cleaning assembly opening being located at the outlet side of the collection chamber.

3. The air filtration system according to claim 1, wherein the mobile diaphragm and the cleaning assembly opening each have a substantially circular cross-section, a diameter of the mobile diaphragm being smaller than a diameter of the cleaning assembly opening.

4. The air filtration system according claim 1, wherein the cleaning assembly opening is delimited by a peripheral edge of the filter housing, the flexible membrane extending along at least a portion of the peripheral edge of the filter housing and being secured to an inner face of the filter housing.

5. The air filtration system according to claim 1, wherein the actuation system comprises a diaphragm housing comprising a peripheral wall portion at least partially delimiting a diaphragm receiving cavity, and a base extending outwardly from an outer face of the peripheral wall portion, the diaphragm assembly being received at least partially in the diaphragm receiving cavity and wherein the diaphragm assembly comprises an outer peripheral edge section secured to the base of the diaphragm housing.

6. The air filtration system according to claim 1, wherein the mobile diaphragm comprises an inner member and an outer member, a portion of the flexible membrane being sandwiched between the inner member and the outer member.

7. The air filtration system according to claim 6, wherein the actuation system comprises at least one actuation member operatively connected to the mobile diaphragm, at a central portion thereof.

8. The air filtration system according to claim 7, wherein the actuation system comprises lower and upper actuation members operatively connected and the lower actuation member is operatively connected to the flexible membrane.

9. The air filtration system according to claim 8, wherein at least one of the lower and upper actuation members is substantially cone-shaped.

10. The air filtration system according to claim 1, further comprising a control assembly including a controller operatively connected to the actuation system and at least one sensor operatively connected to the controller and configured to monitor an operating variable of the air filtration system, wherein the controller actuates the actuation system when the monitored operating variable corresponds to a predetermined cleaning condition.

11. An air filtration system comprising:
- a filter housing defining a collection chamber and comprising an air inlet, an air outlet and a cleaning assembly opening, the air inlet, the outlet and the cleaning assembly opening being in fluid communication with the collection chamber;
- a filter support mounted to the filter housing and extending in the collection chamber with each one of the air inlet and the air outlet being located on a respective side of the filter support; and
- a filter cleaning assembly mounted to the filter housing and comprising:
  - an actuation system comprising a diaphragm housing comprising a peripheral wall portion at least partially delimiting a diaphragm receiving cavity, and a base extending outwardly from an outer face of the peripheral wall portion; and
  - a diaphragm assembly mounted to the filter housing and at partially covering the cleaning assembly opening, the diaphragm assembly being received at least partially in the diaphragm receiving cavity and comprising an outer peripheral edge section secured to the base of the diaphragm housing;
  - wherein the diaphragm assembly vibrates upon actuation of the actuation system so as to displace air in the collection chamber to remove particulate matter from a filter engaged with the filter support.

12. The air filtration system according to claim 11, wherein, when the filter is engaged with the filter support, the collection chamber is separated into an inlet side and an outlet side directed respectively towards the air inlet and the air outlet, the cleaning assembly opening being located at the outlet side of the collection chamber.

13. The air filtration system according to claim 11, wherein the diaphragm assembly comprises a flexible membrane secured to the filter housing and at least partially covering the cleaning assembly opening, and a mobile diaphragm mounted to the filter housing via the flexible membrane.

14. The air filtration system according to claim 13, wherein the flexible membrane has one of a substantially annular shape and a substantially circular cross-section.

15. The air filtration system according to claim 13, wherein the cleaning assembly opening is delimited by a peripheral edge of the filter housing, the flexible membrane extending along at least a portion of the peripheral edge of the filter housing and being secured to an inner face of the filter housing.

16. The air filtration system according to claim 11, further comprising a control assembly including a controller operatively connected to the actuation system and at least one sensor operatively connected to the controller and configured to monitor an operating variable of the air filtration system, wherein the at least one sensor comprises a pressure sensor monitoring pressure in the collection chamber and the monitored operating variable comprises a pressure variation within the collection chamber on each side of a filter engaged with the filter support, wherein the controller actuates the actuation system when the monitored operating variable corresponds to a predetermined cleaning condition.

17. A combustion engine comprising the air filtration system according to claim 1.

18. An air filtration assembly comprising a plurality of air filtration systems according to claim 1, wherein each of said plurality of air filtration systems comprises an airflow regulator, and the air filtration assembly further comprises a controller operatively connected to the airflow regulators to control the respective airflow regulator between an air filtering configuration in which the corresponding filter cleaning assembly is not activated and a cleaning configuration in which, when the filter is engaged with the corresponding filter support, the corresponding filter cleaning assembly is activated to displace air in the collection chamber so as to remove particulate matter from the filter.

19. A method for cleaning the air filtration system according to claim 1, wherein the air filtration system comprises a control assembly including a controller operatively connected to the actuation system and at least one sensor operatively connected to the controller, the method comprising:
- monitoring an operating variable related to the air filtration system via said at least one sensor; and
- actuating the actuation system when the monitored operating variable corresponds to a predetermined cleaning condition.

20. The method according to claim 19, wherein the air filtration system is operatively connected to a combustion engine, the predetermined cleaning condition comprising a rotation speed of the combustion engine.

* * * * *